US011206229B2

(12) United States Patent
Singaraju et al.

(10) Patent No.: US 11,206,229 B2
(45) Date of Patent: Dec. 21, 2021

(54) DIRECTED ACYCLIC GRAPH BASED FRAMEWORK FOR TRAINING MODELS

(71) Applicant: Oracle International Corporation, Redwood Shores, CA (US)

(72) Inventors: Gautam Singaraju, Dublin, CA (US); Crystal Pan, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/823,611

(22) Filed: Mar. 19, 2020

(65) Prior Publication Data

US 2020/0344185 A1    Oct. 29, 2020

Related U.S. Application Data

(60) Provisional application No. 62/839,377, filed on Apr. 26, 2019.

(51) Int. Cl.
*H04L 12/58* (2006.01)
*G06F 16/901* (2019.01)
*G06K 9/62* (2006.01)

(52) U.S. Cl.
CPC .......... *H04L 51/02* (2013.01); *G06F 16/9024* (2019.01); *G06K 9/6267* (2013.01)

(58) Field of Classification Search
CPC .... H04L 51/02; G06F 16/9024; G06K 9/6267
See application file for complete search history.

(56) References Cited

U.S. PATENT DOCUMENTS

| | | | |
|---|---|---|---|
| 2019/0158309 A1* | 5/2019 | Park | H04L 12/2832 |
| 2020/0252205 A1* | 8/2020 | Padmanabhan | G06K 9/6256 |
| 2020/0258509 A1* | 8/2020 | Bharadwaj | H04L 51/02 |

* cited by examiner

*Primary Examiner* — Kristie D Shingles
(74) *Attorney, Agent, or Firm* — Kilpatrick Townsend & Stockton LLP

(57) ABSTRACT

Techniques for chatbots, and more particularly, to techniques for using a directed acyclic graph (DAG) based framework to build and train models. In one particular aspect, a computer implemented method is provided that includes generating, by a DAG based framework, a first model and a second model, executing the first model for a chatbot in run-time and second model for the chatbot in design-time, collecting attributes for intent classification associated with a set of utterances with the chatbot running the first model and the second model, evaluating, using one or more metrics, performance of the first model and the second model based on an analysis of the attributes for the intent classification, determining whether the performance of the second model is improved as compared to the performance of the first model, and executing the first model or the second model for the chatbot in run-time based on the performance determination.

20 Claims, 10 Drawing Sheets

DIRECTED ACYCLIC GRAPH BASED FRAMEWORK FOR TRAINING MODELS

CROSS-REFERENCE TO RELATED APPLICATION

The present application is a non-provisional application of, and claims the benefit and priority under 35 U.S.C. 119(e) of U.S. Provisional Application No. 62/839,377, filed Apr. 26, 2019, entitled "DIRECTED ACYCLIC GRAPH BASED FRAMEWORK FOR TRAINING MODELS". The entire contents of the aforementioned application is incorporated herein by reference in its entirety for all purposes.

FIELD OF THE INVENTION

The present disclosure relates generally to training chatbots, and more particularly, to techniques for using a directed acyclic graph (DAG) based framework to build and train models for chatbots.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

BRIEF SUMMARY

Techniques are provided (e.g., a method, a system, non-transitory computer-readable medium storing code or instructions executable by one or more processors) for using a DAG based framework to build and train models for chatbots.

In various embodiments, a computer implemented method is provided that comprise: generating, by a directed acyclic graph based framework of an integrated computing system, a first model and a second model, wherein the first model is a pipeline of a first set of tasks for performing one or more operations associated with a chatbot and the second model is a pipeline of a second set of tasks for performing the one or more operations associated with the chatbot; executing, by the directed acyclic graph based framework of the integrated computing system, the first model for the chatbot in run-time and second model for the chatbot in design-time; collecting, by an event collector of the integrated computing system, one or more attributes for intent classification associated with a set of utterances with the chatbot running the first model and the second model; evaluating, by an analytic engine of the integrated computing system using one or more metrics, performance of the first model and the second model based on an analysis of the one or more attributes for the intent classification; determining, by the analytic engine, that the performance of the second model based on the evaluation is improved as compared to the performance of the first model; and executing, by the directed acyclic graph based framework of the integrated computing system, the second model for the chatbot in run-time.

In some embodiments, the method further comprises: displaying, graphically on a GUI, the pipeline of the first model; and receiving, through the GUI, a user selection of one or more user-selectable tasks; and displaying, graphically on the GUI based upon the user selection, the first set of tasks with the one or more user-selectable tasks in the pipeline.

In some embodiments, the method further comprises: displaying, graphically on a GUI, the pipeline of the second model; and receiving, through the GUI, a user selection of one or more user-selectable tasks; and displaying, graphically on the GUI based upon the user selection, the second set of tasks with the one or more user-selectable tasks in the pipeline.

In some embodiments, the method further comprises: receiving a user input through a user-selectable item of the one or more user-selectable items; and training the first model and the second model based upon the user input, wherein the user input is a set of utterances considered by a user to trigger an intent.

In some embodiments, the first model running in run-time is executing on a data set to generate an output to be used in downstream processes by the chatbot, wherein the downstream processes include providing dialog or taking action based on the intent classification, and wherein the second model running in the background in design-time is executing on the same data set to generate a different output that is not used in the downstream processes by the chatbot.

In some embodiments, the first set of tasks is different from the second set of tasks, and the difference is addition or subtraction of at least one task, substitution of at least one task, order of processing at least one task, or a combination thereof.

In some embodiments, the executing the first model and the second model comprises obtaining a data set comprising the set of utterances from one or more channels or the data set comprising the set of utterances from a database, and resolving an intent using the first model and the second model based on the set of utterances.

In various embodiments, a system is provided that includes one or more data processors and a non-transitory computer readable storage medium containing instructions which, when executed on the one or more data processors, cause the one or more data processors to perform part or all of one or more methods disclosed herein.

In various embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
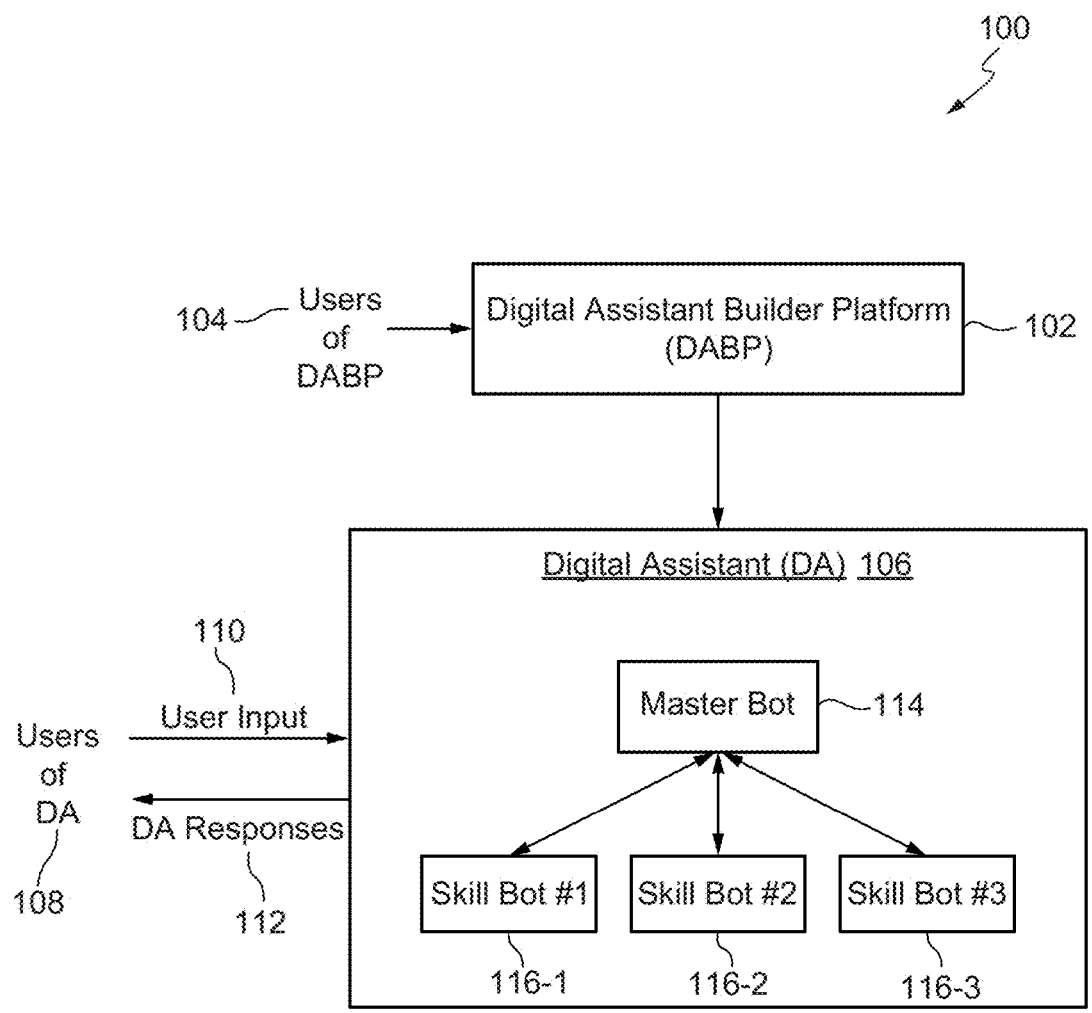
FIG. 1 depicts a simplified block diagram of a distributed environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

A digital assistant is an artificial intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting time cards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

Intents allow the chatbot to understand what the user wants the chatbot to do. Intents are comprised of permutations of typical user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Forget this order!" or "Cancel delivery!"—messages that mean the same thing, but are expressed differently. Collectively, the intents, and the utterances that belong to them, make up a training corpus for the chatbot. By training a model with the corpus, a customer may essentially turn that model into a reference tool for resolving end user input to a single intent. A customer can improve the acuity of the chatbot's cognition through rounds of intent testing and intent training.

However, building a chatbot that can determine the end users' intents based upon user utterances, is a challenging task in part due to the subtleties and ambiguity of natural languages and the dimension of the input space (e.g., possible user utterances) and the size of the output space (number of intents). As such, the chatbot may need to be trained, monitored, debugged, and retrained in order to improve the performance of the chatbot and user experience with the chatbot. In conventional systems, training models are provided that are essentially default training models hard coded into the design system for training and retraining the digital assistant or chatbot. For example, a first model may be provided that only needs a small training corpus, so it may use matching rules to develop entities, intents, and the training corpus. When the training corpus has matured to the point where tests reveal highly accurate intent resolution, a second model may be used to add a deeper dimension to the chatbot's cognition by training using machine learning based on word vectors and other text-based features. These default training models are typically inflexible in the training methodology employed. Thus, it may be difficult to identify the root causes of lower than desired performance of the chatbot and determine how to improve the chatbot without a more flexible approach to training.

Accordingly, a different approach is needed to address these problems. In various embodiments, a directed acyclic graph (DAG) based framework (described herein as the sparky framework or training tool) is provided to build training models for a bot system. Essentially, all tasks or activities to be implemented in the model are laid out in a clear structure or pipeline with discrete processes occurring at set points and clear relationships made to other tasks. If multiple tasks exist, each has at least one defined upstream (previous) or downstream (subsequent) tasks, although each task could easily have both. No task can create data that goes on to reference itself (this avoids any instance of an infinite loop). One model developed using the training tool may be implemented in the bot system during run-time, while one or more additional models also developed using the training tool may be implemented in the bot system concurrently in design-time (i.e., behind the scenes or transparent to the customer). An analytics system integrated with the bot system and DAG based framework may collect metrics during use of the models and may be used to generate scores for each model such that a decision may be made on which model to use in run-time (e.g., replace the original run-time model with a more robust or accurate model operating in design-time). For example, the metrics may provide information to make a decision as to which pipeline of tasks gives the most efficient model (e.g., look at accuracy, how many queries can be handled per second, complexity, etc.). In some embodiments, a customer can use the training tool to edit/change vectors and features of the model at a finer grain level as compared to overall edit/change of model structure. In some embodiments, one or more graphical user interface (GUI) of the analytics system and the training tool may display information related to the DAG based framework such as available tasks or actions, training corpora, pre-configured models or pipelines of tasks, and analytics including the collected metrics. In some embodiments, the GUI may be used by a customer to build or modify one or more training model using the DAG based framework.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of a distributed environment 100 incorporating an exemplary embodiment. Distributed environment 100 comprises a digital assistant builder platform (DABP) 102 that enables enterprises to create and deploy digital assistants for their users. For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. DABP 102 can be used to create one or more digital assistants (or DAs) 106. DABP 102 can be used by multiple enterprises to create digital assistants for their users. For example, as shown in FIG. 1, user 104 representing a particular enterprise can use DABP 102 to create and deploy a digital assistant 106 for users of the particular enterprise. For example, an owner of a restaurant (e.g., a pizza shop) may use DABP 102 to create and deploy a digital assistant that enables customers of the restaurant to order food (e.g., order pizza).

Once a digital assistant 106 is deployed, users 108 may use the digital assistant 106 to perform various tasks via natural language-based conversations with the digital assistant 106. As part of a conversation, a user 108 may provide one or more user inputs 110 and get responses 112 back from the digital assistant 106. Via these conversations, a user can request one or more tasks to be performed by the digital assistant 106 and, in response, the digital assistant 106 is configured to perform the user-requested tasks and respond with appropriate responses to the user.

User inputs 110 are in a natural language and are referred to as utterances. A user utterance can be in text form (e.g., when the user types something as input to digital assistant 106) or in audio input or speech form (e.g., when the user says something as input to digital assistant 106). The utterances are typically in a language spoken by the user 108. When a user input 110 is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. A text utterance, input by the user 108 or generated from converting speech input to text form, can be a text fragment, a sentence, multiple sentences, and the like. Digital assistant 106 is configured to apply natural language understanding (NLU) techniques to the text utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents.

For example, the user input 110 may request a pizza to be ordered, for example, "I want to order a pizza." Digital assistant 106 is configured to understand the meaning of the utterance and take appropriate actions that may involve responding to the user with questions requesting user input on the type of pizza the user desires to order, the size of the pizza, any toppings for the pizza, and the like. The responses 112 provided by digital assistant 106 may also be in the form of natural language, which may involve natural language generation (NLG) processing performed by digital assistant 106. Once digital assistant 106 has the requisite information from the user, digital assistant 106 may then cause a pizza to be ordered. Digital assistant 106 may end the conversation with the user by outputting information indicating that the pizza has been ordered.

In certain embodiments, an utterance received as input by digital assistant 106 goes through a series or pipeline of processing steps. These steps may include, for example, parsing the utterance, understanding the meaning of the utterance, refining and reforming the utterance to develop a better understandable structure for the utterance, determining an action to be performed in response to the utterance, causing the action to be performed, generating a response to be output to the user responsive to the user utterance, outputting the response to the user, and the like.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). A digital assistant 106 may use a NLP engine and/or a machine learning model (e.g., an intent classifier) to map end user utterances to specific intents (e.g., specific task/action or category of task/action that the chatbot can perform). For example, a machine learning based NLP engine may learn to understand and categorize the natural language conversations from the end users and to extract necessary information from the conversations to be able to take precise actions, such as performing a transaction or looking up data from a backend system of record. In certain embodiments, the NLU processing or portions thereof is performed by digital assistant 106 itself. In some other embodiments, digital assistant 106 may use other resources to perform portions of the NLU processing. For example, the syntax and structure of a sentence may be identified by processing the sentence using a parser, a part-of-speech tagger, and/or a named entity recognizer. In one implementation, for the English language, a parser, a part-of-speech tagger, and a named entity recognizer provided by the Stanford Natural Language Processing (NLP) Group is used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. In certain embodiments, digital assistant 106 provides subsystems (e.g., component implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server, and can also take advantage of the generic subsystems provided, if needed.

A digital assistant, such as digital assistant 106, can be made available to its users through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant contains or is associated with one or more skills. In certain embodiments, these skills are individual chatbots (referred to as skill bots) that are designed to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant 106 includes skills 116-1, 116-2, and so on. For purposes of this disclosure, the terms "skill" and "skills" are used synonymously with the terms "skill bot" and "skill bots" respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as the "skills store") that offers multiple skills directed to a wide range of tasks. The skills offered through the skills store may expose various cloud services. A user 104 of DABP 102 can access the skills store via DABP 102, select a desired skill and add the selected skill to a digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

In certain embodiments, a digital assistant created and deployed using DABP 102 is implemented using a master bot/child(or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 itself acts as the master bot.

A digital assistant implemented according to the master-child bot architecture enables users of the digital assistant to interact with multiple skills through a unified user interface. When a user engages with a digital assistant 106, the user input is received by the master bot 114, which then processes the user input to identify a user request and based upon the processing determines whether the user request task can be handled by the master bot 114 itself, else the master bot 114 selects an appropriate skill bot 116-1,2, or 3 for handling the user request and routes the conversation to the selected skill bot 116-1,2, or 3. This enables a user 108 to, through a common single interface, converse with and use several skill bots configured to perform specific tasks. For example, for a digital assistant 106 developed for an enterprise, the master bot 114 of the digital assistant 106 may interface with skill bots 116-1, 116-2, etc. with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer 108 of the digital assistant 106 need only know how to access the digital assistant 106.

In a master bot/child bot infrastructure, the master bot is configured to be aware of the list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to identify or predict a specific skill bot, from the multiple available skill bots, that can best serve or handle the user request. The master bot then routes the utterance (or a portion of the utterance) to that specific skill bot for further handling. Control thus flows from the master bot to the skill bots. The master bot can support multiple input and output channels.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a use of DABP 102 to create a digital assistant including one or more skill bots associated with the digital assistant. For example, a skill bot can be created by cloning an existing skill bot, cloning an existing skill bot and then making modifications to the skill bot, or can be created from scratch using tools and services offered by DABP 102. In certain embodiments, DABP 102 provides a skills store or skills catalog offering multiple skill bots for performing various tasks. A user of DABP 102 can clone a skill bot from the skills store and create a new skill bot.

DABP 102 also enables a user (e.g., a skill bot designer) to create a skill bot from scratch. In certain embodiments, at a high level, creating a skill bot involves the following steps:
(1) Configuring settings for a new skill bot
(2) Configuring one or more intents for the skill bot
(3) Configuring entities for one or more intents
(4) Training the skill bot
(5) Creating a dialog flow for the skill bot
(6) Adding custom components to the skill bot
(7) Testing and deploying the skill bot (1) Configuring settings for a new skill bot—A skill bot designer can specify one or more invocation names for the skill bot being created. These invocation names can be used in utterances to explicitly identify and invoke the skill bot in the digital assistant. The skill bot designer may also specify example utterances for the skill bot. These example utterances are representative of utterances for the skill bot. When user inputs are received, the intent analysis engine of the digital assistant compares the user inputs to these example utterances to determine if the particular skill bot is to be invoked.

(2) Configuring one or more intents for the skill bot—The skill bot designer may configure one or more intents (also referred to as bot intents) for a skill bot being created. These intents identify tasks that the skill bot can perform for users of the digital assistant. Each intent is given a name. For example, for a skill bot configured to help users perform various banking transactions, intents may be specified by the skill bot designer for the skill bot such as "CheckBalance," "TransferMoney," "DepositCheck," and the like. For each intent, the skill bot designer specifies a set of example utterances that are representative of and illustrate the meaning of the intent and are typically associated with the task performed by that intent. For example, for the CheckBalance intent, example utterances may include "What's my savings account balance?", "How much is in my checking account?", "How much money do I have in my account," and the like. Accordingly, permutations of typical user requests and statements may be specified as example utterances for an intent.

(3) Configuring entities for one or more intents of the skill bot—In some instances, additional context may be needed to enable the skill bot to properly respond to a user request. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill example, an entity called AccountType, which defines values called "checking" and "saving" may enable the skill bot to parse the user request and respond appropriately. One or more entities can be specified for certain intents configured for the skill bot. Entities are thus used to add context to the intent itself. Entities help describe an intent more fully and enable the skill bot to complete a user request. In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input, parse or otherwise process the received input, and identify or select an intent that is relevant to the received user input. In order for this to happen, the skill bot has to be trained. In certain embodiments, a skill bot is trained based upon the intents configured for the skill bot and the example utterances associated with the intents (collectively, the training data), so that the skill bot can resolve user input to one of its configured intents. In certain embodiments, a skill bot is represented by a model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof, as described in detail herein with respect to DAG based framework. In certain embodiments, a portion (e.g., 80%) of the training data is used to train a skill bot model and another portion (e.g., the remaining 20%) is used to test or verify the model. Once trained, the skill bot can then be used to handle and respond to user utterances. In certain cases, a user's utterance may be a question that requires only a single answer and no further conversation. In order to handle such situations, a Q&A (question-and-answer) intent may be configured for a skill bot. This enables a skill bot to output replies to user requests without having to update the dialog definition. Q&A intents are created in a similar manner as regular intents. The dialog flow for Q&A intents is however different from regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take (e.g., how the skill bot responds to user utterances, how the skill bot prompts users for input, how the skill bot returns data). The dialog flow is like a flowchart followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition contains three sections:
(a) a context section
(b) a default transitions section
(c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot names components that provide the functionality needed corresponding to the states. Components enable a skill bot to perform the functions. In certain embodiments, DABP 102 provides a set of preconfigured components for performing a wide range of functions. A skill bot designer can select one or more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stored information about the one or more skill bots associated with the digital assistant.

At the master bot or digital assistant level, when a user inputs a phrase or utterance to the digital assistant, the digital assistant is configured to perform processing to determine how to route the conversation. The digital assistant determines this using a routing model, which can be rules-based, AI-based, or a combination thereof. The digital assistant uses the routing model to determine whether the conversation corresponding to the user input is to be routed to a particular skill for handling, is to be handled by the digital assistant or master bot itself per a built-in system intent, or is to be handled as a different state in a current conversation flow.

In certain embodiments, as part of this processing, the digital assistant determines if the user input identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific invocation, in certain embodiments, the digital assistant evaluates the received user input and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input. In certain embodiments, after one or more skill bots are identified as candidates, the intents associated with those candidate skills are evaluated (according to the intent model for each skill) and confidence scores are applied to each intent. In general, any intent that has a confidence score exceeding a threshold value is treated as a candidate flow. If a particular skill bot is selected, then the user input is routed to that skill bot for further processing. If a system intent is selected, then one or more actions are performed according to the selected system intent.

Figure 2:
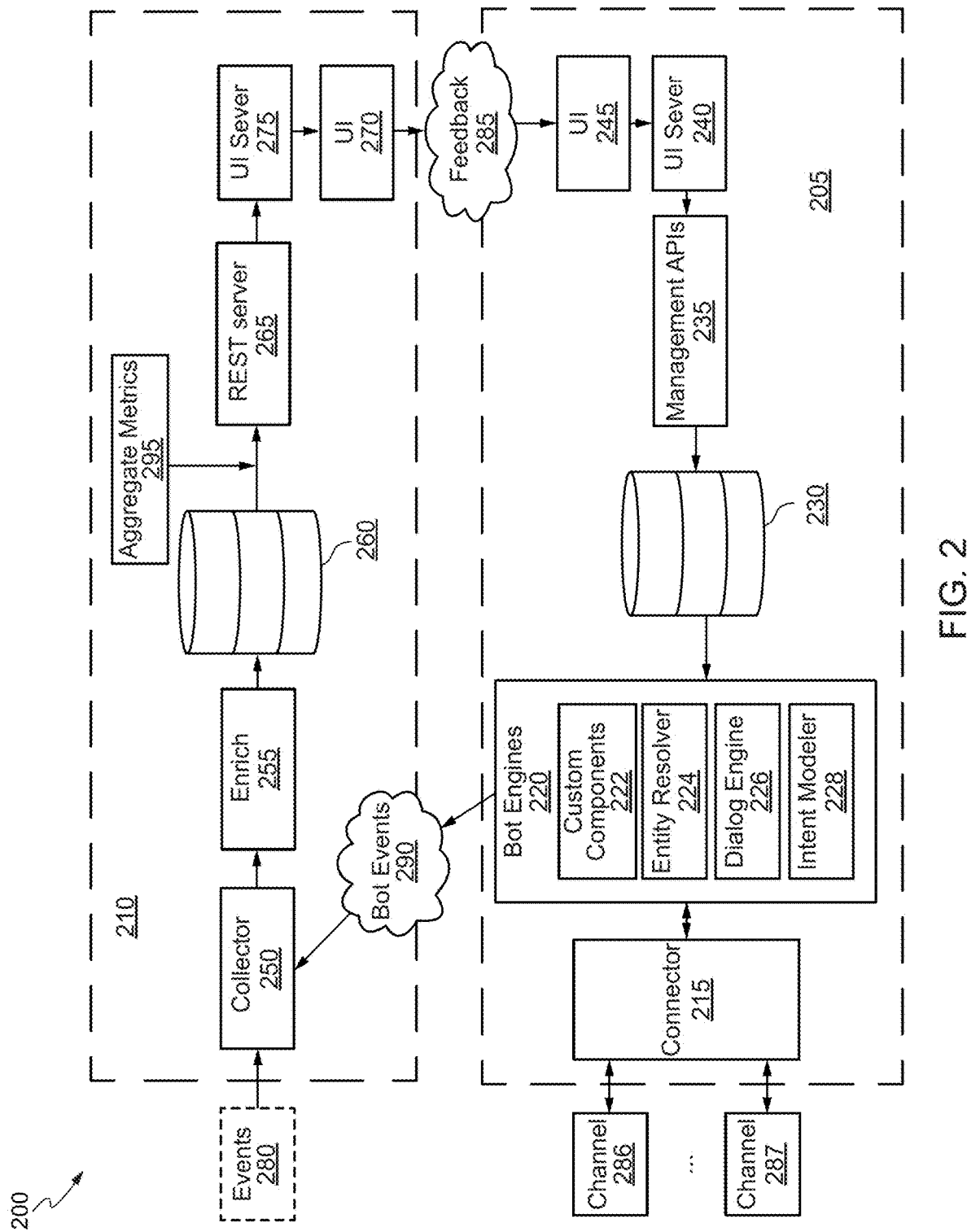
FIG. 2 depicts an integrated system including a bot system and a bot analytic system for monitoring, analyzing, visualizing, and improving the performance of a bot system in accordance with various embodiments.

FIG. 2 depicts an integrated system 200 including a bot system 205 (such as digital assistant or bot system 106 as described with respect to FIG. 1) and a bot analytic system 210 for monitoring, analyzing, visualizing, and improving the performance of the bot system according to certain embodiments. As illustrated, the bot system 205 may include a connector 215 and a plurality of bot engines 220, such as a dialog engine 222, an intent modeler 224, an entity resolver 226, and custom components 228. The bot system 205 may also include a database 230, management APIs 235, a user interface 245, and a UI server 240. The bot analytic system 210 may include a collector 250, an enrichment engine 255, a database 260, and a REST server 265. The bot analytic system 210 may also include a user interface 270 and a UI server 275. Collector 250 of the bot analytic system 210 may collect events 290 occurred at the bot system 205. Feedback 285 from the bot analytic system 210 may be provided to the bot system 205 through user interface 270 and user interface 245.

Connector 215 may act as an interface between the bot system 205 and one or more end users through one or more channels, such as channels 286 and 287. Each channel may be a messaging application, such as a messaging channel (such as Facebook Messenger, Facebook WhatsApp, WeChat, Line, Kik, Telegram, Talk, Skype, Slack, or SMS), a virtual private assistant (such as Amazon Dot, Echo, or Show, Google Home, Apple HomePod, etc.), a mobile and web app extension that extends native or hybrid/responsive mobile app or web application with chat capabilities, or voice based input (such as devices or apps with interfaces that use Siri, Cortana, Google Voice, or other speech input for interaction). In some embodiments, connector 215 may normalize content from different channels such that the bot system 205 may analyze content across different messaging application systems. The content normalization processing may include formatting content from each type of messaging application to a common format for processing. In some embodiments, the bot system 205 may include one or more connectors for each of the channels. Intent modeler 228 may be used to determine end user intents associated with end user utterances. After normalization, a probability that the occurrence of a word may signify a certain intent may be determined. In some examples, probabilities can be combined using basic probability arithmetic as if they were independent.

Examples may also be provided to prevent the model from making wrong assertions. For example, particular sub-phrases, or words only appearing for a certain intent, may cause wrong assertions. Similarly, the model may be prevented from synthesizing broad rules using similar sentences belonging to different intents for the training.

Entity resolver 224 may identify entities (e.g., objects) associated with the end user intents. For example, in addition to the end user intent identified by intent modeler 228, such as "order pizza," entity resolver 224 may resolve entities associated with the intent, such as the pizza type, toppings, and the like.

Dialog engine 226 may be used to handle the conversations between the end users and the bot system. For example, dialog engine 226 may respond to end user utterances based on the end user intent identified by intent modeler 228 and entities associated with the end user intent identified by entity resolver 224. In some embodiments, dialog engine 226 may use a state machine that includes user defined states (e.g., end user intents) and actions to take in the states or from state to state to handle the conversations with end users.

Custom components 222 may include customized modules for the specific bot system. For example, a financial bot may include custom components that may be used to, for example, checking balance, transfer funds, or pay bills.

Database 230 may be used to store data for the bot system, such as data for the classification models, logs of conversation, and the like. Management APIs 235 may be used by an administrator or developer of the bot system to manage the bot system, such as re-training the classification models, editing intents, or otherwise modifying the bot system. The administrator or developer may use user interface 245 and UI server 240 to manage the bot system.

Various events 290 may be generated while the bot system 205 is running. The events 290 may be generated based upon one or more instructions included in the bot system. For example, an event 290 may be generated when the bot system 205 has entered into a particular state, where the particular state is defined by an administrator or developer of the bot system. As events 290 are generated, the events 290 may be collected, stored, and analyzed by the bot analytic system 210. When capturing an event 290, additional information associated with the event 290 may also be collected, where the additional information may indicate a present context in which the event 290 is generated.

For example, conversation events may be generated by dialog engine 226. A conversation event may include a message received by a bot system from an end user device (referred to as msg_received). Msg_received may include one or more of the following parameters or variables: the content of the message, the time when the message is received by the bot system 205, the language of the message received, a device property (e.g., version or name), an operating system property (e.g., version or name), a geolocation property (e.g., an Internet Protocol address, a latitude, a longitude, or the like), identification information (e.g., a user ID, a session ID, a bot system ID, a tenant ID, or the like), a time stamp (e.g., device created, device sent, collector derived time stamp), the channel, or the like.

A conversation event may also include a message sent by a bot system 205 to an end user device (referred to as msg_sent). Msg_sent may include one or more of the following: the content of the message (e.g., text or HTML of the message), the time when the message is sent by the bot system, the language of the message, a creator of the message (e.g., the bot system or an end user device), a device property, an operating system property, a browser property (e.g., version or name), an app property (e.g., version or name), a geolocation property (e.g., an Internet Protocol address, a latitude, a longitude, or the like), identification information (e.g., a user ID, a session ID, a bot system ID, a tenant ID, or the like), a channel (e.g., Facebook or Webhook), or the like.

Dialog engine 226 may also generate dialog state execution events. As described above, dialog engine 226 may use a state machine to determine the flow of the conversations with end users. The state machine may include a set of states and rules of transition between the states. Dialog engine 226 may execute the state machine for each end user conversation, and a dialog state execution event may be produced for each state that dialog engine 226 steps through to process end user utterances. Attributes of a dialog state execution event may include, for example, a state name, component name, next action, entity match, intent match, variable, user query statement, response statement, time of execution, communication language, device property, operating system property, geolocation property, identification information, a time stamp, a channel, or the like. The state name be a name of a state currently executed or an "error state." The component name may be a name of a bot component executed for a current state. The next action may be a next action to be executed. The entity match may be an entity resolved in a current message. The intent match may be an intent resolved with a score value. The variable may be a variable value for a current state. The query statement may be a message sent by an end user. A response statement may be a message sent to an end user. The time of execution may be a time stamp of a completed state execution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

An intent resolution event may occur as a result of the execution of intent modeler 228. Intent modeler 228 may use trained or otherwise defined classification models to identify the end user intents from a set of intents based on the end user utterances. The result of the intent classification may be captured as intent resolution event attributes, which may include, for example, the final intent classification result (e.g., the identified intent) and confidence score associated with each respective intent in the set of intents.

Entity resolver 224 may generate entity resolver events. Entities are objects associated with end user intents. Entity definition rules may be determined when the bot system is created. For example, in addition to resolving end user intents, such as "order pizza," the bot system may also use entity resolver 224 to resolve associated entities, such as pizza type, toppings, and the like. An entity resolver event may be captured at an entity resolution. Examples of attributes associated with an entity resolver event may include an entity name, a rule applied, a search term, a state resolved, a query statement, an entity type, a time of execution, a communication language, a device property, an operating system property, a browser property, an app property, a geolocation property, identification information, a time stamp, a channel, or the like. The entity name may be a name of an entity currently being resolved. The rule applied may be, for example, preceding, following, or aggregate. The search term may be from, to, destination, origin, or the like. The state resolved may be a dialog state resolved for the entity. The query statement may be a message containing entity value. The entity type may be system or derived. The time of execution may be a time stamp of an entity resolution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

A custom component 222 may also generate events, such as a predefined event or a custom event. The predefined event may be a property captured at an execution of a custom component. Examples of attributes of the predefined event may include: a component name, an event name, a payload, a time of execution, a communication language, a device property, an operating system property, a browser property, an app property, a geolocation property, identification information, a time stamp, a channel, or the like. The component name may be a name of a custom component currently being executed. The event name may be invoked, invocation_failed, replied, replied_failed, or the like. The payload may be, in case of failure, reason for failure, stack trace, or the like. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

The custom component 222 may also issue a custom event during execution of a custom component. Examples of attributes of the custom event may include a component name, an event name, a custom payload, a time of execution, a communication language, a device property, an operating system property, a browser property, an app property, a geolocation property, identification information, a time stamp, a channel, or the like. The component name may be a name of a custom component currently being executed. The event name may be a user-defined event name (e.g., Balance_Retrieved). The payload may be, for example, {"amount": "USD 100", "account": "checking"}. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

Error events and timeout events may also be generated by the bot system 205 during execution. An error event may be generated when an error occurs. A timeout event may be generated when the end user conversation has been inactive for a period of time, which may be configured at the channel.

The bot analytic system 210 may collect the events 290 and additional information as the bot system 205 conducts conversations with end users and generates the corresponding events. For example, collector 250 may collect the events 290 and the additional information and send the collected information to a queue. In some embodiments, collector 250 may be configurable and can be programmed to collected different events and/or event attributes described above as desired. For example, collector 250 may be configured to capture dialog state attributes, intent resolution attributes, entity resolution attributes, and error and timeout attributes. In some embodiments, collector 250 may also be configured to collect information regarding events 280 generated by a system other than the bot system.

Enrichment engine 255 may perform validation and enrichment on the collected events and other information and write them to database 260. For example, based on a collected IP address, enrichment engine 255 may determine the location of the end user associated with the IP address. As another example, enrichment engine 255 may extract certain features from the collected information, such as determining a web browser or channel used by the end user. REST server 265 may analyze the enriched events and other information and generate various reports based on certain aggregate metrics 295. The reports may be displayed to an owner, administrator, or developer of the bot system 205 on user interface 270 through UI server 275. The owner, administrator, or developer of the bot system 205 may provide feedback 285 to the bot system 205 for improving the bot system 205.

DAG Based Framework

There is an increasingly large number of data processing workflows involved in the development of a machine learning system and running models in production. The pipeline (a set of stages that are executed one after another) for a modeling workflow typically runs from ingesting and cleaning data, through feature engineering and model selection in an interactive workbench environment, to training and experiments, usually with the option to share results, to deploying the trained model, to serving results like predictions and classifications. Managing the complexity of these pipelines is getting harder, especially when a user may be trying to use real-time data and update models frequently. There are various conventional tools, libraries and frameworks for machine learning, and many users have their own particular set that they like to work with, and the tools, libraries and frameworks all integrate differently with data stores and the platforms that run machine learning models. However, to achieve extend-ability, ease of coding and scalability, machine learning pipelines, particularly machine learning pipelines used in natural language processing (e.g., with chat bots), need a mechanism to easily define, build and test pipelines.

The mechanism disclosed herein is a DAG based framework (also described herein as the training framework or a training tool) to programmatically author, model, and monitor workflows related to bots of a bot system. The DAG based framework may be implemented as part of the a digital assistant builder platform (DABP) 102 described with respect to FIG. 1, and analyzed and monitored for performance using the bot analytic system 210 described with respect to FIG. 2. The DAG based framework while described herein with respect to exemplary linguistic models should be understood to be applicable to handle any machine learning models. The training framework is a modular machine learning framework for quick development and deployment of machine learning algorithms for service applications such as Oracle Digital Assistant. In some embodiments, the training framework is built upon a cluster-computing framework such as Apache Spark, which has distributed implementations of machine learning algorithms on a cluster of computing nodes allowing the models to scale during training and deployment. The training framework comes out of box with a set of transformers, and additional transformers may be built and added over time. An example of a simple transformer would be splitting a string based on a space. The training framework may be implemented to author workflows for training chatbots as DAGs of tasks. The training framework may execute the tasks on an array of worker nodes while following the specified dependencies of nodes defined in the workflows. The training framework may include command line utilities that allow for performing complex changes to the tasks. The training framework may also include graphical user interfaces that makes it easy to visualize pipelines running in production, monitor progress, and troubleshoot issues when needed.

Figure 3:
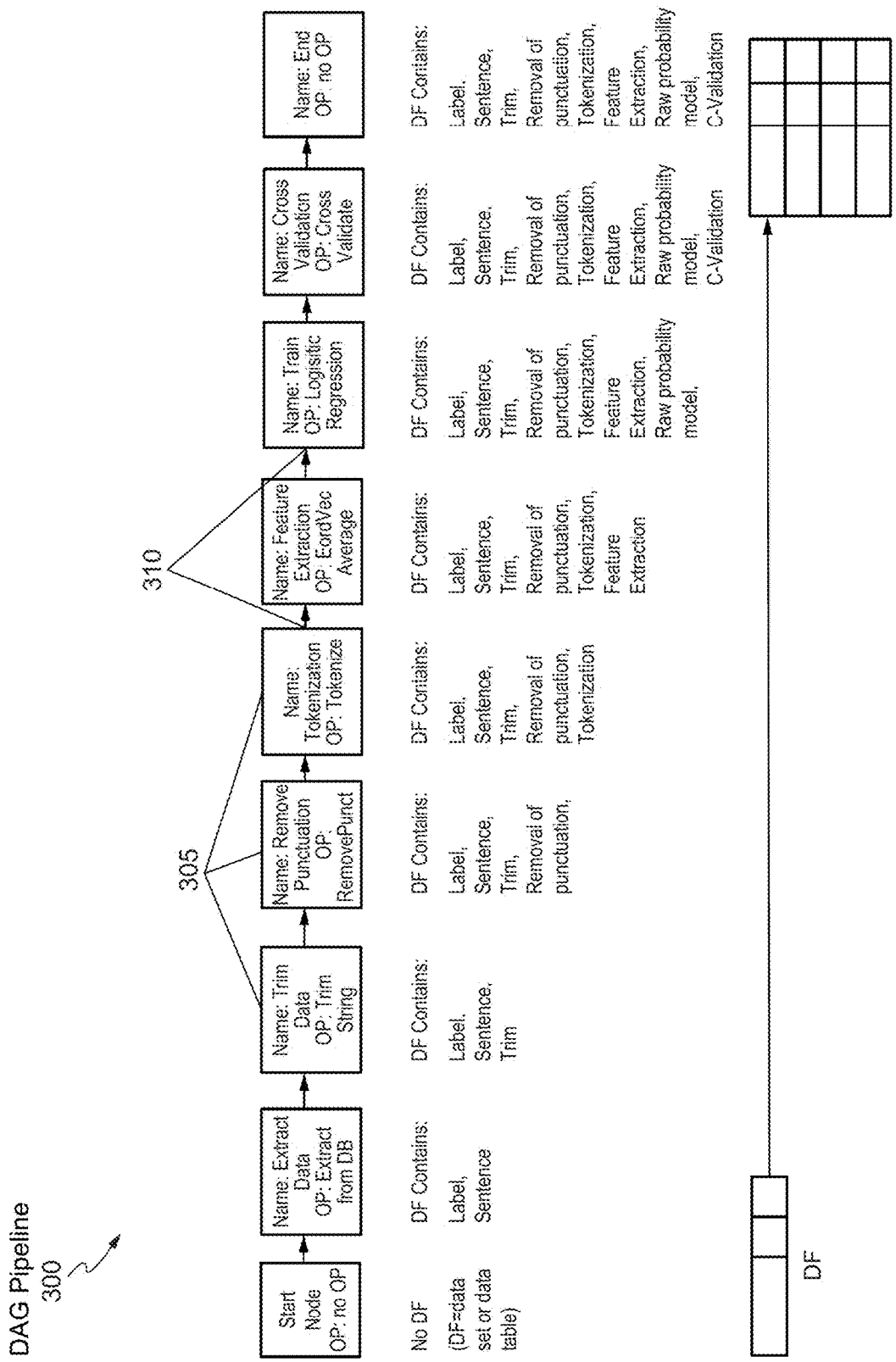
FIG. 3 depicts a pipeline in accordance with various embodiments.
Figure 4:
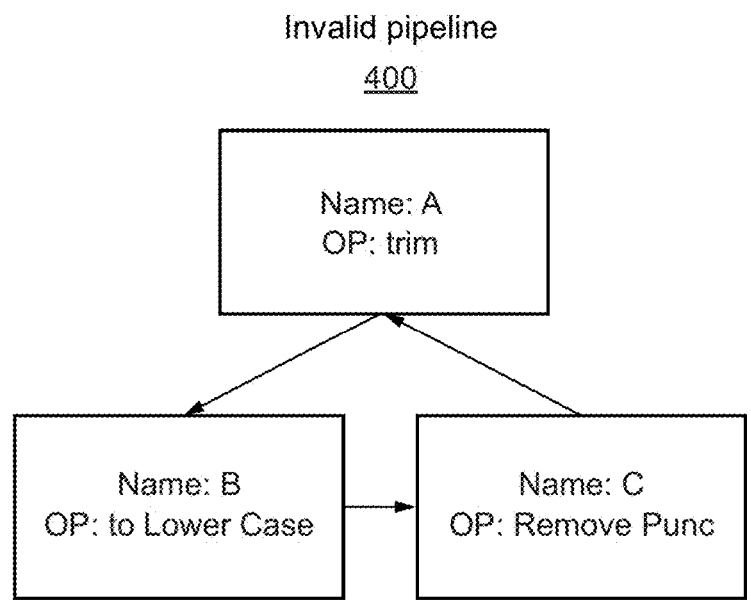
FIG. 4 depicts an invalid pipeline in accordance with various embodiments.

Essentially, all tasks or activities to be implemented in a model are laid out in a clear structure or pipeline with discrete processes occurring at set points and clear relationships made to other tasks. If multiple tasks exist, each has at least one defined upstream (previous) or downstream (subsequent) tasks, although each task could easily have both. No task can create data that goes on to reference itself (this avoids any instance of an infinite loop). As shown in FIG. 3, a DAG based pipeline 300 may be defined as a JSON object containing an acyclic array of nodes 305, and connection 310 between the nodes. The pipeline 300 is a graph which holds the track of operations (OP) applied on a dataset (DF) (e.g., a data table) such as Resilient Distributed Datasets (RDD). The track of operations are directly connected from one node to another. This creates a sequence i.e. each node is in linkage from earlier to later in the appropriate sequence, and each node automatically identifies outputs from a previous node as inputs and output of a current node as input for a next node. Each node within the sequence adds a new field to the DF, which is moved from one node to another as the workflow progresses through the pipeline 300. Moreover, the pipeline is defines such that there is no cycle or loop available. Once a transformation takes place it cannot return to its earlier position. Due to the acyclic nature of the nodes and connectivity thereof, the cluster-computing framework is capable of automatically identifying cyclic dependencies and rejects the pipeline during a pipeline detection stage. FIG. 4 shows an invalid pipeline 400 with a cyclic dependency.

In various embodiments, the DAG based pipeline 300 includes: (i) one or more nodes 305 (also described herein as a stage, transformer, or transformer stage), (ii) one or more connections 310, and (iii) optionally one or more complex connections (see, e.g., FIG. 6). Each node 305 has a stage definition comprising: a "Name", a class to be invoked via an introspective function such as Java Reflection, parameters needed by the class, and one or more operations (OP) performed on a given data set. A class is a user defined blueprint or prototype from which objects may be created. The class represents the set of properties or methods that are common to all objects of one type. In general, class declarations can include: modifiers (e.g., public or private access), a class name, a superclass (the name of the class's parent), interfaces or the operations (e.g., a list of interfaces implemented by the class), and the body of the class. The introspective function such as Reflection is a feature that allows an executing program to examine or "introspect" upon itself, and manipulate internal properties of the program. For example, it's possible for a class to obtain the names of all its members and display them. The parameters needed by the class refers to the list of variables in a method declaration such as doubles, floats, integers, or the like. The connections 310 define the order in which the nodes are to be called and operations performed. The complex connections provide for multi-input nodes, a pipeline as a separate node amongst multiple pipelines, and an ignore function for stages that are already complete.

In the pipeline 300, each node 305 adds a new field to the data frame. An example of a node (a feature extraction node) is as follows:

```
{
    "params": {
        "intentServer.sparkySettings.featureExtractor.location":
"\/u01\/app\/data\/word_vectors\/glove.6B.100d",
        "intentServer.sparkySettings.featureExtractor.type": "word2vec"
    },
    "class": "oracle.cloud.bots.intent.model.spark.stages.featureExtraction.FeatureExtractionStages"
}
```

Each node 305 may implement a single method for a single input node. As the pipeline 300 is built on a DAG based framework, resiliency and distributed computing comes implicitly. In some embodiments, this single method can be changed to simplify the method further by not passing the framework session. In the above example, the framework session is being passed so that the class may also register user defined functions (UDFs) that the framework may need, e.g., public PipelineStage getStage(SparkSession spark){ }.

Figure 5:
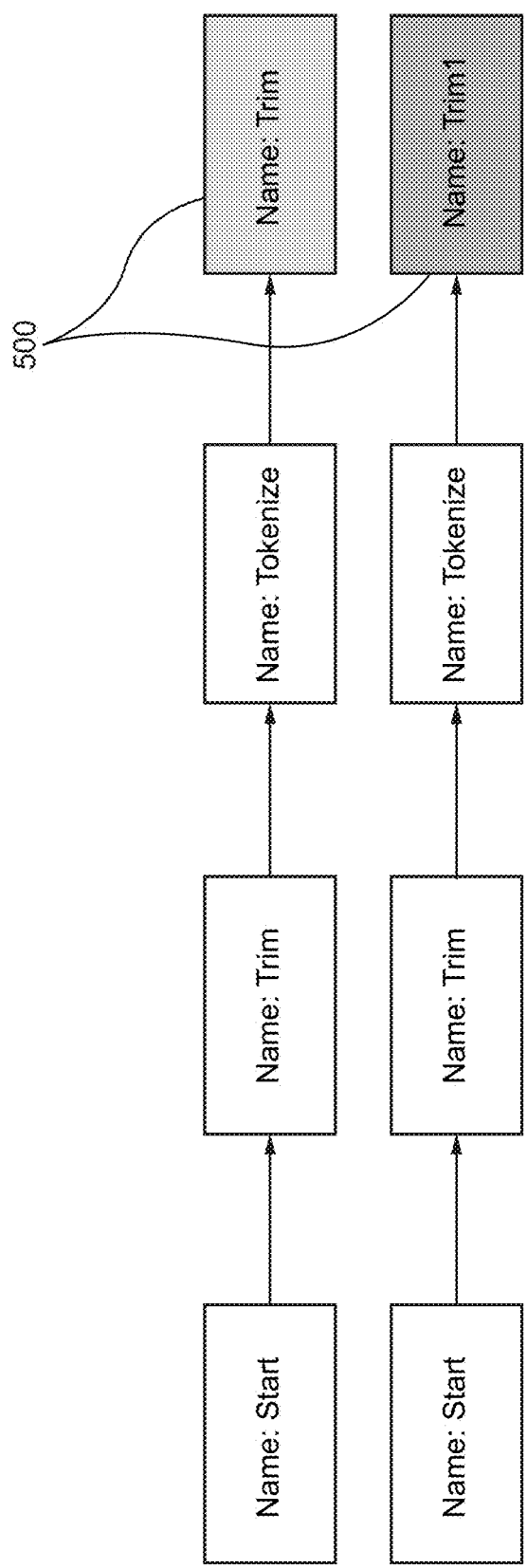
FIG. 5 depicts a name check process for nodes in accordance with various embodiments.

The one or more nodes 305 implicitly include the following features: (i) only one output field/stage which is the node name (complex objects can be stored in the pipeline); and (ii) a same name in different parts of pipeline is not allowed (a new node 500 with a different name needs to be created in order to implement a node having the same functionality as another node, as shown in FIG. 5).

An example pipeline is shown below. The pipeline shows a few nodes (JSONObject "nodes"), and the order of execution of those nodes (JSONObject "pipelines").

```
{
    "nodes": {
        "trim": {
            "class": "oracle.cloud.bots.intent.model.spark.stages.preprocessing.TrimPreprocessorStage"
        },
        "start": {
        },
        "rempunctuation": {
            "class":
"oracle.cloud.bots.intent.model.spark.stages.preprocessing.RemovePunctuationPre-
```

```
processorStag
e"
    },
    "model": {
      "params": {
        "intentServer.sparkySettings.trainingModel.name":
"org.apache.spark.ml.classification.LogisticRegression",
        "family": "multinomial"
      },
      "class": "oracle.cloud.bots.intent.model.spark.stages.train.TrainStages"
    },
    "end": {
    },
    "featureextraction": {
      "params": {
        "intentServer.sparkySettings.featureExtractor.location":
"\/u01\/app\/data\/word_vectors\/glove.6B.100d",
        "intentServer.sparkySettings.featureExtractor.type": "word2vec"
      },
      "class":
"oracle.cloud.bots.intent.model.spark.stages.featureExtraction.FeatureExtractionStages"
    },
    "tokenization": {
      "class":
"oracle.cloud.bots.intent.model.spark.stages.preprocessing.TokenizePreprocessorStage"
    }
  },
  "pipelines": [
    "start",
    "trim",
    "rempunctuation",
    "tokenization",
    "featureextraction",
    "model",
    "end"
  ],
  "tenantid": "chatbot-tenant",
  "botid": "83A1B880-5FE9-4E78-A755-C8EA09E1A0E7"
}
```

Figure 6:
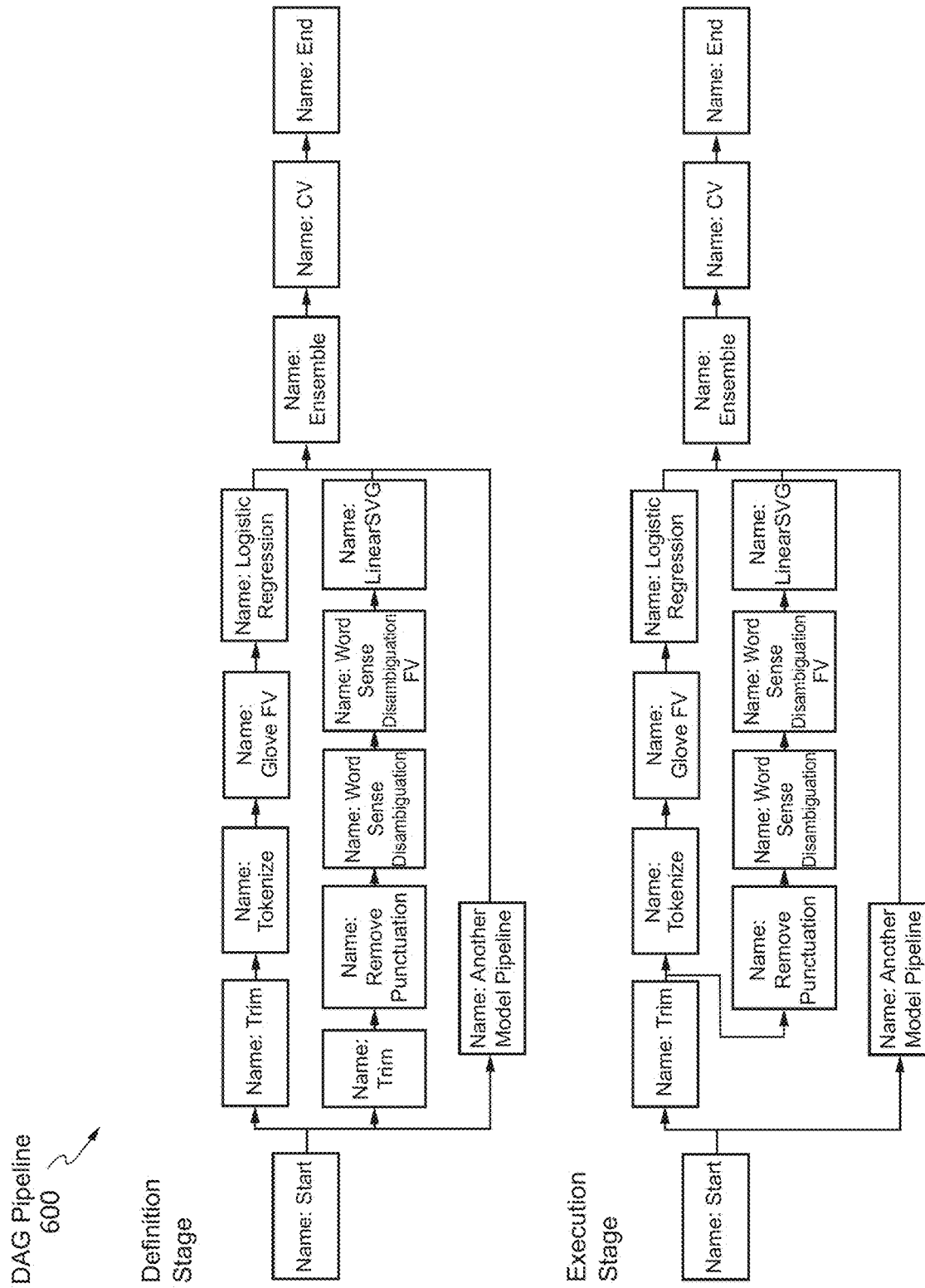
FIG. 6 depicts a complex pipeline in accordance with various embodiments.

FIG. 6 shows an example of a complex machine learning pipeline 600 which has task alignment (which tasks are duplicate) and task dependency alignment. A DAG structure helps with detecting cyclic requirements and also identify task dependency alignment.

In various embodiments, the cluster-computing framework includes the following features: (i) model definition (e.g., a Domain-Specific Language (DSL) based configuration), (ii) model performance, and (iii) the actual machine learning model. The advantage of this mechanism is that, as long as the implementations of the model definition are not changed, a model can still execute a self-contained model. Following is an example of a DSL configuration. The following model shows: the different steps of the model (AVG_word2vec_LogisticRegression): lower→trim→remove_punctuation→tokenization→feature_extraction→model. In some embodiments, steps can be introduced/removed into the pipeline. This compartmentalizes the development of models. For example, the cluster-computing framework by default can do multiple (e.g., 5) fold cross validation; and provides the metrics.

```
{
  "CV": {
    "numFolds": 5
  },
  "nodes": {
    "end": { },
    "featureextraction": {
      "class":
"oracle.cloud.bots.intent.model.spark.stages.featureExtraction.FeatureExtractionStages",
      "params": {
        "featureextractor.languagelabel": "English",
        "featureextractor.type": "word2vec"
      }
    },
    "lower": {
      "class":
"oracle.cloud.bots.intent.model.spark.stages.preprocessing.LowercasePreprocessorStage"
    },
    "model": {
      "class": "oracle.cloud.bots.intent.model.spark.stages.train.TrainStages",
      "inference": "oracle.cloud.bots.intent.model.spark.model.inference.LogisticRegression",
      "params": {
```

```
        "stageParams": {
          "regParam": [
            0.1,
            0.01
          ]
        },
        "trainer.name": "org.apache.spark.ml.classification.LogisticRegression"
      }
    },
    "rempunctuation": {
      "class":
"oracle.cloud.bots.intent.model.spark.stages.preprocessing.RemovePunctuationPre-
processorStag
e"
    },
    "start": { },
    "tokenization": {
      "class":
"oracle. cloud.bots.intent.model.spark.stages.preprocessing.TokenizePreprocessorStage"
    },
    "trim": {
      "class": "oracle.cloud.bots.intent.model.spark.stages.preprocessing.TrimPre-
      processorStage"
    }
  },
  "pipelines": [
    "start",
    "lower",
    "trim",
    "rempunctuation",
    "tokenization",
    "featureextraction",
    "model",
    "end"
  ]
}
```

With respect to model performance, the cluster-computing framework can use multi-fold cross validation to report the performance numbers. These numbers may be dependent on the data at the time of training. An example of these metrics, which may be available with the model are shown below. In some embodiments, these metrics can be exposed to the customers. An immediate glance shows that the model has an accuracy of 1; with an f-score of 0.806.

```
{
  "accuracy": 1,
  "confusionMatrix": "4.0 0.0 0.0 0.0 1.0 0.0 0.0 0.0 2.0 ",
  "f1scoreClass:Balances": 1,
  "f1scoreClass:Send Money": 1,
  "f1scoreClass:Track Spending": 1,
  "modelAVGMetrics": [
    0.8062962962962963,
    0.8062962962962963
  ],
  "precisionClass:Balances": 1,
```

```
  "precisionClass:Send Money": 1,
  "precisionClass:Track Spending": 1,
  "recallClass:Balances": 1,
  "recallClass:Send Money": 1,
  "recallClass:Track Spending": 1,
  "weightedF1Score": 0.9999999999999999,
  "weightedFalsePositive": 0,
  "weightedPrecision": 0.9999999999999999,
  "weightedRecall": 0.9999999999999999
```

Advantageously, the implementation of the cluster-computing framework to build pipelines for the bot system has the ability to reduce model sizes, in some instance by a factor of ten, achieve improved accuracy, and improved fscore (a measure of a model's accuracy, considers both the precision p and the recall r of the test to compute the score) metrics. Below in Tables 1-3 are shown some exemplary model sizes, accuracy and fscore metrics achieved with the sparky framework.

TABLE 1

| | | | Model Sizes | |
|---|---|---|---|---|
| BOT | # Intents | 1. Utterances | AVG_word2vec_LogisticRegression (running on Sparky Framework) Model Size | Tamao Model size |
| Financial | 5 | 56 | 20.9 KB | 20 MB |
| Retail | 12 | 188 | 33.8 KB | 48 MB |
| Insurance | 44 | 429 | 92.3 KB | 2.4 MB |
| Ask Ubuntu | 5 | 162 | 19.5 KB | 20 MB |
| Chat Bot | 2 | 206 | 14.5 KB | 4 MB |
| Web Application | 8 | 90 | 22.7 KB | 32 MB |

TABLE 1-continued

Model Sizes

| BOT | # Intents | 1. Utterances | AVG_word2vec_LogisticRegression (running on Sparky Framework) Model Size | Tamao Model size |
|---|---|---|---|---|
| News Corpus | 8 | 5485 | 26.9 KB | 32 MB |
| Modern CX | 116 | 978 | 217.7 KB | 5.9 MB |
| Snips | 7 | 13784 | 25.4 KB | 28 MB |
| Cognitive Computing | 50 | 5452 | 102.5 KB | 26.7 MB |

TABLE 2

Model Accuracy

| Bot | # Intents | # Utterances | AVG_word2vec_LogisticRegression | LibLinear | LibSVM |
|---|---|---|---|---|---|
| Financial | 5 | 56 | 100% | 89% | 87% |
| Retail | 12 | 188 | 91% | 88% | 85% |
| Insurance | 44 | 429 | 79% | 80% | 81% |
| Ask Ubuntu | 5 | 162 | 94% | 90% | 94% |
| Chat Bot | 2 | 206 | 98% | 98% | 99% |
| Web Application | 8 | 90 | 89% | 89% | 87% |
| News Corpus | 8 | 5485 | 95% | 96% | 96% |
| Modern CX | 116 | 978 | 74% |  | 52% |
| Snips | 7 | 13784 | 96% | 98% |  |
| Cognitive Computing | 50 | 5452 | 59% | 79% | 65% |

TABLE 3

Model F1 Score

| Bot | # Intents | # Utterances | AVG_word2vec_LogisticRegression | Tamao |
|---|---|---|---|---|
| Financial | 5 | 56 | 100% | 69% |
| Retail | 12 | 188 | 91% | 74% |
| Insurance | 44 | 429 | 74% | 70% |
| Ask Ubuntu | 5 | 162 | 94% | 93% |
| Chat Bot | 2 | 206 | 98% | 98% |
| Web Application | 8 | 90 | 75% | 82% |
| News Corpus | 8 | 5485 | 90% |  |
| Modern CX | 116 | 978 | 64% |  |
| Snips | 7 | 13784 | 96% |  |
| Cognitive Computing | 50 | 5452 | 35% |  |

Dependency on the cluster-computing framework during query time has been removed to get higher queries per second. As the amount of memory required for each model is 10 times lower for AVG_word2vec_LogisticRegression as compared to Tamao, as more bots are added, performance is more stable. With the cluster-computing framework, intent classification is no longer memory bound, but CPU bound. In some embodiments, the AVG_word2vec_LogisticRegression model uses Glove 100$d$ with 6 billion tokens word vectors. With 110 utterances, the models are achieving close to 91.87% accuracy. With 220 utterances, the models are achieving close to 93.97% accuracy. With 330 utterances, the models are achieving close to 95.17% accuracy. It typically requires about 1984 utterances, to get above 97% in accuracy.

Variation in Testing of Models

The ability to describe a model as a JSON object in the cluster-computing framework allows for: (i) multiple models to be tested, and (ii) multiple variations of a single model to be tested. In various embodiments, when a customer executes a training method (e.g., activates the train button in a GUI), the cluster-computing framework computes a model (which is known to perform best on multiple datasets) and makes the model available for customers to use. In some embodiments, the user is able to use the cluster-computing framework to manually create, train, modify, retrain, and execute the model. In other embodiments, the cluster-computing framework automatically creates, trains, modifies, retrains, and executes the model. In other embodiments, a combination of user input and automated processes on the cluster-computing framework creates, trains, modifies, retrains, and executes a model. An indication may be provided to the customers that "a" model has been trained, and the bot running the model is usable for run-time; but further exploration for a model may be performed in the background or in design-time. In other words, (i) multiple models, and (ii) multiple variations of a single model may continue to be trained and monitored to determine which models are running the best based on one or more parameters configured to measure performance of the model(s).

Customers may provide various parameters across which they would like to tune their models, for example, some customers would like to have high accuracy at the cost of throughput; while others would like to optimize the throughput by sacrificing a bit of accuracy. Deployment of the model can be performed automatically, for example, based on the number of classification requests per second, cost to scale classification during peak hours, and/or based on the highest accuracy. As shown below and described herein, The model and its accuracy is already captured as per the cluster-computing framework in the model.

```
{
  "accuracy": 1,
  "confusionMatrix": "4.0 0.0 0.0 0.0 1.0 0.0 0.0 0.0 2.0 ",
  "f1scoreClass:Balances": 1,
  "f1scoreClass:Send Money": 1,
  "f1scoreClass:Track Spending": 1,
  "modelAVGMetrics": [
     0.8062962962962963,
     0.8062962962962963
  ],
  "precisionClass:Balances": 1,
  "precisionClass:Send Money": 1,
  "precisionClass:Track Spending": 1,
  "recallClass:Balances": 1,
  "recallClass:Send Money": 1,
  "recallClass:Track Spending": 1,
  "weightedF1Score": 0.9999999999999999,
  "weightedFalsePositive": 0,
  "weightedPrecision": 0.9999999999999999,
  "weightedRecall": 0.9999999999999999
}
```

By creating different getModel( ) methods (multiple models) each containing a different learning algorithm, a user can create a new model for training. For example, the following definition builds a logistic regression model.

```
JSONObject getModel( ) {
    JSONObject nodeparams = new JSONObject( );
    JSONObject subnodeparams = new JSONObject( );
    nodeparams.put(SparkModelKeys.CLASS,
  oracle.cloud.bots.intent.model.spark.stages.train.TrainStages.class.ge
tCanonicalName( ));
    subnodeparams.put(SparkModelKeys.JSON_INTENT_TRAINER_NAME,
  org.apache.spark.ml.classification.LogisticRegression.class.getCanonic
alName( ));
    JSONObject stageparams = new JSONObject( );
  stageparams.put(SparkModelKeys.JSON_INTENT_TRAINER_PARAMS_REG_PARAM,
  new Double[ ] { 0.1, 0.01 });
    subnodeparams.put(SparkModelKeys.STAGE_PARAMS, stageparams);
    nodeparams.put(SparkModelKeys.PARAMS, subnodeparams);
    nodeparams.put(SparkModelKeys.INFERENCE,
  oracle.cloud.bots.intent.model.spark.model.inference.LogisticRegressio
n.class.getCanonicalName( ));
    return nodeparams;
  }
```

Another model design technique is to skip certain preprocessing steps to be able to create different variations of a model. For example, in the following code multiple models are returned. These models try out different permutations and combinations of lowercase, removing punctuations and trim nodes; resulting in eight ($2^3$) models that would be tested.

```
public List<JSONObject> getModelDef( ) {
    if (this.modelDef == null) {
        modelDef = new ArrayList<JSONObject>( );
        List<String> modelChanges = new ArrayList<String>( );
        modelChanges.add(SparkModelKeys.LOWERCASE_NODE);
     modelChanges.add(SparkModelKeys.REMOVEPUNCTU-
ATION_NODE);
        modelChanges.add(SparkModelKeys.TRIM_NODE);
        Set<List<String>> l = combinations(modelChanges);
        CommonStageDefinitions cs = new CommonStageDefinitions( );
        for (List<String> lv : l) {
           JSONObject node = new JSONObject( );
           node.put(SparkModelKeys.START_NODE,
  cs.getNoOp( ));
           if (lv.contains(SparkModelKeys.LOWERCASE_NODE))
      node.put(SparkModelKeys.LOWERCASE_NODE, cs.getLowercase( ));
           if
  (lv.contains(SparkModelKeys.REMOVEPUNCTUATION_NODE))
           node.put(SparkModelKeys.REMOVEPUNCTUATION_NODE,
  cs.getRemovePunctuation( ));
           if (lv.contains(SparkModelKeys.TRIM_NODE))
              node.put(SparkModelKeys.TRIM_NODE,
  cs.getTrim( ));
           node.put(SparkModelKeys.TOKENIZATION_NODE,
  cs.getTokenization( ));
           Language language = bot.getPredominantLanguage( );
           if (Language.zh != language) {
              language = Language.en;
           }
         node.put(SparkModelKeys.FEATUREEXTRACTION_NODE,
  cs.getFeatureExtraction(language.getLabel( )));
           node.put(SparkModelKeys.MODEL_NODE,
  this.getModel( ));
           node.put(SparkModelKeys.END_NODE, cs.getNoOp( ));
           JSONObject tmodelDef = new JSONObject( );
           tmodelDef. put(SparkModelKeys.NODES, node);
           tmodelDefput(SparkModelKeys.PIPELINES,
  this.getPipeline( ));
           tmodelDef.put(SparkModelKeys.CV_NODE, cs.getCV( ));
           modelDef.add(tmodelDef);
        }
    }
    return this.modelDef;
}
```

Techniques for Creating Models and Implementing Models

Figure 7:
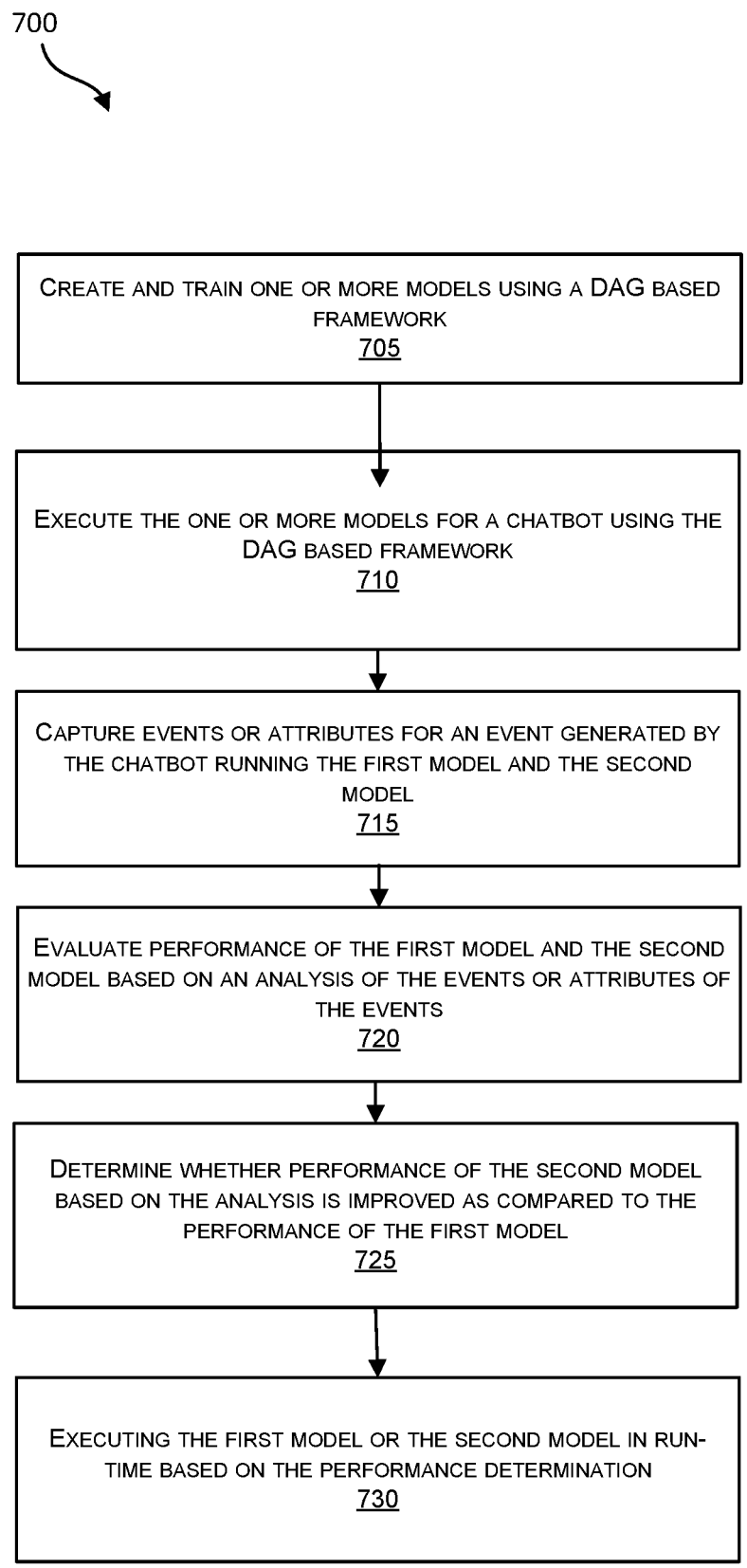
FIG. 7 illustrates a process flow for building, training, and implementing one or more models in accordance with various embodiments.

FIG. 7 is a simplified flowchart 700 illustrating an example of processing for monitoring, analyzing, visualizing, and improving the performance of a bot system according to certain embodiments. The processing depicted in FIG. 7 may be performed by a bot builder platform, a cluster-computing framework, and an integrated system, such as the digital assistant builder platform, the cluster-computing framework, and the integrated system described with respect to FIGS. 1-6. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel.

At step 705, a DAG based framework (e.g., the cluster-computing framework) is used to generate one or more models from a pipeline of tasks and train the one or more models to be implemented by a chatbot. For example, a number of natural language processing tasks may be implemented within a pipeline to generate a model for predicting an intent from an utterance. In some embodiments, the one or more models are multiple models, each model has a different method of execution. In some embodiments, the one or more models is a single model with multiple permutations (variations exist between each version of the model). At least one of the one or more models is implement for the chatbot in run-time, whereas the remainder of models or variations of the model may be run in the background in design-time. The model(s) running in run-time are executing on a data set to generate an output to be used in downstream processes by the chatbot (e.g., predict the intent of a user from an utterance such that the chatbot can provide dialog or take action based on the predicated intent of the user). In contrast, the model(s) running in the background in design-time are executing on the same data set to generate an output; however, the output is not used in downstream processes by the chatbot and instead the output is being used to analyze performance of the model(s) running in the background versus the model(s) running in run-time. In other words, the model(s) running in run-time are executing within a chatbot for performing or enabling chatbot functions and the model(s) running in the background in design-time are executing within the chatbot or external to the chatbot for purposes of analytics and comparison the model running in run-time.

The pipeline is a collection of all the tasks a client wants to run in a chatbot, organized in a way that reflects their relationships and dependencies. For example, a simple pipeline could consist of three tasks: A, B, and C. The pipeline via nodes and connections could provide that A has to run successfully before B can run, but C can run anytime. The pipeline could provide that task A times out after 5 minutes, and B can be restarted up to 5 times in case it fails. The pipeline might also say that the workflow will run for every utterance. In this way, a DAG describes how a client wants a chatbot to carry out the workflow. The tasks A, B, and C could be anything related to implementing one or more functions of a chatbot. For example, in a first pipeline, A may obtain data from a database, B may prepare data by trimming the data for C to analyze while C may train or execute an algorithm or machine learning model using the trimmed data as input. Alternatively, in a second pipeline, A may obtain data from a database, B may prepare data by removing punctuation for C to analyze while C may train or execute an algorithm or machine learning model using the data with removed punctuation as input. The results of the first and second pipelines may be compared via an analytics system to determine the best approach for processing the data. The important thing is that the DAG isn't concerned with what its constituent tasks do; the DAG's job is to make sure that whatever the tasks do happens at the right time, or in the right order, or with the right handling of any unexpected issues.

In some embodiments, the DAG based framework of an integrated computing system is used to generate a first model and a second model. In some instances, the generating comprises training the first model and the second model on sets of data prior to being deployed and implemented by a chatbot. In certain instances, the first model and second model are trained based upon the intents configured for the chat bot (e.g., a skill bot) and example utterances associated with the intents (collectively, the training data), so that the chat bot using the first model and/or the second model can resolve user input to one of its configured intents. The first model is a first pipeline of a first set of tasks for performing one or more operations associated with a chatbot. The one or more operations are performed in sequence on a first set of nodes, and each node automatically identifies outputs from a previous node as inputs and output of a current node as input for a next node. Each node within the sequence adds a new field to a data table, which is moved from one node to another as the workflow progresses through the first pipeline. The second model is a second pipeline of a second set of tasks for performing one or more operations associated with the same chatbot. The one or more operations are performed in sequence on a second set of nodes, and each node automatically identifies outputs from a previous node as inputs and output of a current node as input for a next node. Each node within the sequence adds a new field to a data table, which is moved from one node to another as the workflow progresses through the second pipeline.

The first set of tasks is different from the second set of tasks. The difference can be the addition or subtraction of at least one task, the substitution of at least one task, or the order of process at least one task. For example, the first set of tasks may include data extraction, trimming of data, removal of punctuation, tokenization, feature extraction, model training, and cross validation. The second set of tasks may include data extraction, removal of punctuation, tokenization, feature extraction, model training, and cross validation. Alternatively, a second set of tasks may include data extraction, trimming of data, removal of punctuation, tokenization, feature extraction, a first model training, a second model training, and cross validation. Alternatively, a second set of tasks may include data extraction, trimming of data, removal of punctuation, word sense disambiguation, feature extraction, model training, and cross validation. Alternatively, the second set of tasks may include data extraction, trimming of data, removal of punctuation, tokenization, feature extraction, model training, and cross validation. As should be understood the first set of tasks is implement for the chatbot in run-time, whereas the second set of tasks may be run in the background in design-time. The first set of tasks running in run-time are executing on a data set to generate an output to be used in downstream processes by the chatbot (e.g., predict the intent of a user from an utterance such that the chatbot can provide suggestions or take action based on the predicated intent of the user). In contrast, the second set of tasks running in the background in design-time are executing on the same data set to generate an output; however, the output is not used in downstream processes by the chatbot and instead the output is being used to analyze performance of the second set of tasks running in the background versus the first set of tasks running in run-time, which is the reason the first set of tasks is different from the second set of tasks.

At step 710, the first model is executed by the directed acyclic graph based framework of the integrated computing system for the chatbot in run-time and the second model is executed by the directed acyclic graph based framework of the integrated computing system for the chatbot in design-time. The executing the first model and the second model may comprise obtaining content data from one or more channels (e.g., obtain user content data at connector 215 through channels 286 or 287 as described with respect to FIG. 2) or content data from a database (e.g., obtain content data such as logs of conversation at a bot engine 220 from the database 230 as described with respect to FIG. 2), and resolving an intent using the first model and the second model (e.g., a model running in bot engine 220 as intent modeler 228 as described with respect to FIG. 2). The executing further comprises generating events (e.g., bot events 290 as described with respect to FIG. 2) in response to resolving the intent. The events may be generated based upon one or more instructions included in the integrated computing system that request the collection of one or more attributes for intent classification associated with a set of utterances. In the instance of the first model, the executing further comprises the chatbot generating dialogue (e.g., using dialog engine 226 as described with respect to FIG. 2), resolving an entity (e.g., using entity resolver 224 as described with respect to FIG. 2), and/or executing an operation or action (e.g., initiating the ordering of a pizza) in response to resolving the intent.

At step 715, an event collector of the integrated computing system (e.g., event collector 250 as described with respect to FIG. 2) is configured to capture one or more attributes for intent classification associated with a set of utterances with the chatbot running the first model and the second model. The attributes are any piece of information that may enable the generation of a metric to measure performance of the models in predicting or classifying an intent from the set of utterances. For example, the attribute may include: the set of utterances, the final intent classification result (e.g., the identified intent), the parameters (e.g., the weights and biases) currently used by the model(s) for the prediction or classification, the hyperparameters currently used by the model(s) for the prediction or classification, the size of the model(s), the probability percentage assigned to each intent by the model(s) for the prediction or classification, average query time, model processing time, or classification time, and the confidence score associated with each respective intent in the set of intents identified as being a possibility for the final intent classification.

As should be understood, the events and attributes collected by the event collector are not limited to intent classification associated with a set of utterances, which is provided as an illustrative example. The events generated by the bot system may include, for example, conversation events, dialog state execution events, intent resolution events, entity resolution events, and events generated by custom components. The event collector may be configured to collect desired events or desired attributes associated with the various events such as intent classification. The integrated computing system may collect the events and additional information as the chatbot resolves intents using the first model and the second model and generates the corresponding events, and as the chatbot conducts conversations with end users using the first model and generates the corresponding events. For example, the event collector may collect the events and the additional information and send the collected information to a queue. In some embodiments, event collector may be configurable and can be programmed to collected different events and/or event attributes described above as desired. For example, the event collector may be configured to capture dialog state attributes, intent resolution attributes, entity resolution attributes, and error and timeout attributes. In some embodiments, the collector may also be configured to collect information regarding events generated by a system other than the integrated computing system.

At step 720, an analytic engine of the integrated computing system using one or more metrics, evaluates performance of the first model and the second model based on an analysis of the one or more attributes for the intent classification. For example, the event collector may collect the events including the attributes of the event and additional information and send the collected information to an evaluation queue. An enrichment engine (e.g., the enrichment engine 255 as described with respect to FIG. 2) may perform validation and enrichment on the queued events and other information and write the collected events, attributes, enrichment data, and additional information to a database. For example, based on a collected IP address, enrichment engine may determine the location of the end user associated with the IP address and append the enrichment data to the events or attributes. The analytics engine may then analyze the collected events, attributes, enrichment data, and additional information and calculate one or more metrics such as interpretability, usefulness, accuracy, logarithmic loss, confusion matrix, area under the curve, fscore, mean absolute error, mean squared error, and the like indicative of model usefulness and/or performance. A metric may be computed based upon the one or more events or attributes described above. The metric may be computed daily, weekly, month, or a custom range. Examples of basic metrics include (1) a number of unique, total, new, active, inactive, or returning end users, (2) total sessions/conversations, (3) average, maximum, median, or minimum conversation duration, (4) average time between two conversations of an end user, (5) sentiment (positive, negative, or neutral), (6) number of end users, number of conversations, or number of unique end users, (7) average, maximum, median, or minimum message count, or the like. Each metric may be filtered by channel (e.g., Facebook or webhook), geography (e.g., country, state, city, or zip code), language (e.g., English or Spanish), device and its type (e.g., iPhone, Samsung, Motorola, LG, HP, or Dell), OS and its version (e.g., Windows, iOS, Android, Mac, or Linux), browser and its version (e.g., Firefox, Safari, Internet Explorer, or Chrome), app name and its version (e.g., integrated chat within an app), agent type (e.g., bot system or user device), or the like. In some examples, a custom event from a custom component may have a custom report that is developed by a bot developer.

Interpretability of data of machine learning models is one of those aspects that is critical in the practical 'usefulness' of a data pipeline and it ensures that the model is aligned with the problem trying to be solved by the chatbot. In some instances, the metrics used for interpretability and usefulness analysis may include: (i) bias such as word2vec vectors that may contain gender biases or the size of the training data set with a corpus breadth that is too small, (ii) context such as training data that is only a rough representation of the problem and a model that is failing to capture the full complexity of the real-life task, (iii) weights that are obtained after training are a direct proxy of feature importance and provide very concrete interpretation of the model internals, e.g., when building a text classifier the most important features can be plotted and used to verify whether the model is overfitting on noise, (iv) the gradients of the target concept calculated in a backward pass may be used to produce a map that highlights the important regions in the input for predicting the target concept, and (v) specific input such as the set of utterances, which may be modified and the impact on the predictions may be monitored.

Accuracy, logarithmic loss, confusion matrix, area under the curve, fscore, mean absolute error, mean squared error are those metrics that are critical in the practical 'performance' of a data pipeline and it ensures that the model is solving the problem accurately and efficiently. Classification Accuracy is typically the metric used when evaluating the performance of a model. It is the ratio of number of correct predictions to the total number of input samples. Logarithmic Loss or Log Loss, works by penalizing the false classifications. It works well for multi-class classification. When working with Log Loss, the classifier must assign probability to each class for all the samples. In general, minimizing Log Loss gives greater accuracy for the classifier. Confusion matrix provides a matrix as output and describes the complete performance of the model. The confusion matrix forms the basis for the other types of metrics. Area under curve is one of the most widely used metrics for evaluation. Area under curve may be used for binary classification problem. Area under curve of a classifier is equal to the probability that the classifier will rank a randomly chosen positive example higher than a randomly chosen negative example. Fscore or F1 Score is used to measure a test's accuracy. Fscore is the harmonic mean between precision and recall. The range for Fscore is [0, 1] and it provide information regarding how precise a classifier is (how many instances it classifies correctly), as well as how robust it is (it does not miss a significant number of instances). Mean absolute error is the average of the difference between the original values and the predicted values. Mean absolute error provides the measure of how far the predictions were from the actual output. Mean squared error is similar to mean absolute error, with the only difference being that mean squared error takes the average of the square of the difference between the original values and the predicted values. The advantage of mean squared error being that it is easier to compute the gradient, whereas mean absolute error requires complicated linear programming tools to compute the gradient.

At step 725, the analytic engine of the analytic system, determines whether performance of the second model based on the analysis is improved as compared to performance of the first model. In some instances, the analytic engine of the analytic system, determines the performance of the second model based on the analysis is improved as compared to performance of the first model. In other instances, the analytic engine of the analytic system, determines the performance of the second model based on the analysis is not improved as compared to performance of the first model. At 730, when the performance of the second model is improved over the first model, the directed acyclic graph based framework of the integrated computing system executes the second model for the chatbot in run-time. In other words, the directed acyclic graph based framework of the integrated computing system starts using the second model in run-time rather than the first model because the second model is out performing the first model. In contrast, when the performance of the second model is not improved over the first model, the directed acyclic graph based framework of the integrated computing system executes the first model for the chatbot in run-time. In other words, the directed acyclic graph based framework of the integrated computing system continues using the first model in run-time rather than the second model because the first model is out performing the second model. Although only two models are discussed with respect to the process of flowchart 700, it should be understood that other models may be implemented and evaluated in accordance with the description provided herein (e.g., one model may be running in run-time while an ensemble of two or more models are running in the background for evaluation of performance of the models).

As described herein, an analytics system integrated with the bot system and DAG based framework may collect metrics during use of the models and may be used to generate scores for each model such that a decision may be made on which model to use in run-time (e.g., replace the original run-time model with a more robust or accurate model operating in design-time). For example, the metrics may provide information to make a decision as to which pipeline of tasks gives the most efficient model (e.g., look at accuracy, how many queries can be handled per second, complexity, etc.). In some embodiments, a customer can use the training tool to edit/change vectors and features of the model at a finer grain level as compared to overall edit/change of model structure. In some embodiments, one or more graphical user interface (GUI) of the analytics system and the training tool may display information related to the DAG based framework such as available tasks or actions, training corpora, pre-configured models or pipelines of tasks, and analytics including the collected metrics. In some embodiments, the GUI may be used by a customer to build or modify one or more training model using the DAG based framework.

In some embodiments, a report may be generated based on the analysis of the attributes and the report may include information indicating one or more utterances or messages from one or more end users for which an intent was not able to be identified (sometimes referred to as an unresolved intent). For example, a bot system may calculate a likelihood that a message from an end user is associated with an intent. If the likelihood is less than a threshold, the message may not be associated with the intent. If the message is not associated with any intent, the bot system may not be able to further a conversation. Instead, the bot system may have to ask one or more additional questions to identify the intent. By presenting information regarding a message where an intent was not able to be identified, the analysis and/or report may enable a user or the sparky framework to reconfigure a model of the bot system to properly identify the intent when receiving a new message similar to the message. For example, the report may present one or more potential intents based upon likelihoods such that the user may select an intent from the one or more potential intents so that the message may be added to a training dataset used for training the classification model for identifying the intent from a message.

In some embodiments, a bot analytic system may identify what parts of a conversation with a bot system are working well and what are not. The bot analytic system may enable a user or the sparky framework to drill down into a conversation history, track abandoned/completed intents and conversations, identify most/least popular path taken for a completed path based upon depth, time, or both, or identify a history of all abandoned conversations with transcripts to trouble-shoot why the conversations were abandoned (e.g., number of states traversed, error conditions, or the like) or why a certain pipeline is ineffective. In some embodiments, the result generated by the bot analytic system may be filtered. The filtering may be based upon the channel, length, intent, abandoned/completed, or the like.

Illustrative Systems

Figure 8:
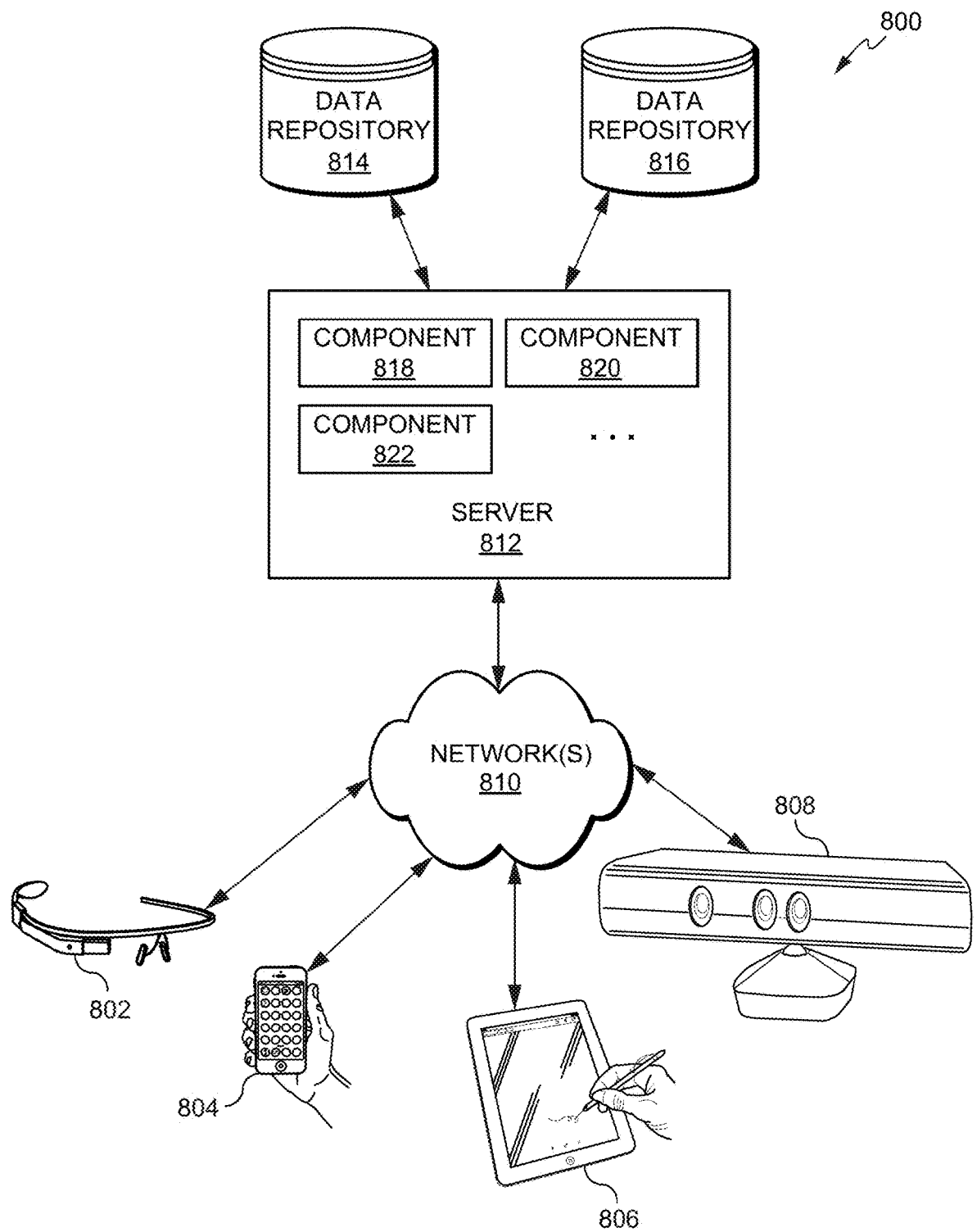
FIG. 8 depicts a simplified diagram of a distributed system for implementing various embodiments.

FIG. 8 depicts a simplified diagram of a distributed system 800. In the illustrated example, distributed system 800 includes one or more client computing devices 802, 804, 806, and 808, coupled to a server 812 via one or more communication networks 810. Clients computing devices 802, 804, 806, and 808 may be configured to execute one or more applications.

In various examples, server 812 may be adapted to run one or more services or software applications that enable one or more embodiments described in this disclosure. In certain examples, server 812 may also provide other services or software applications that may include non-virtual and virtual environments. In some examples, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The example shown in FIG. 8 is thus one example of a distributed system for implementing an example system and is not intended to be limiting.

Users may use client computing devices 802, 804, 806, and/or 808 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 8 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 810 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 may include one or more virtual machines running virtual operating systems, or other computing architectures involving virtualization such as one or more flexible pools of logical storage devices that may be virtualized to maintain virtual storage devices for the server. In various examples, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information in certain examples. For example, one or more of the data repositories 814, 816 may be used to store information such as information related to chatbot performance or generated models for use by chatbots used by server 812 when performing various functions in accordance with various embodiments. Data repositories 814, 816 may reside in a variety of locations. For example, a data repository used by server 812 may be local to server 812 or may be remote from server 812 and in communication with server 812 via a network-based or dedicated connection. Data repositories 814, 816 may be of different types. In certain examples, a data repository used by server 812 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 814, 816 may also be used by applications to store application data. The data repositories used by applications may be of different types such as, for example, a key-value store repository, an object store repository, or a general storage repository supported by a file system.

Figure 9:
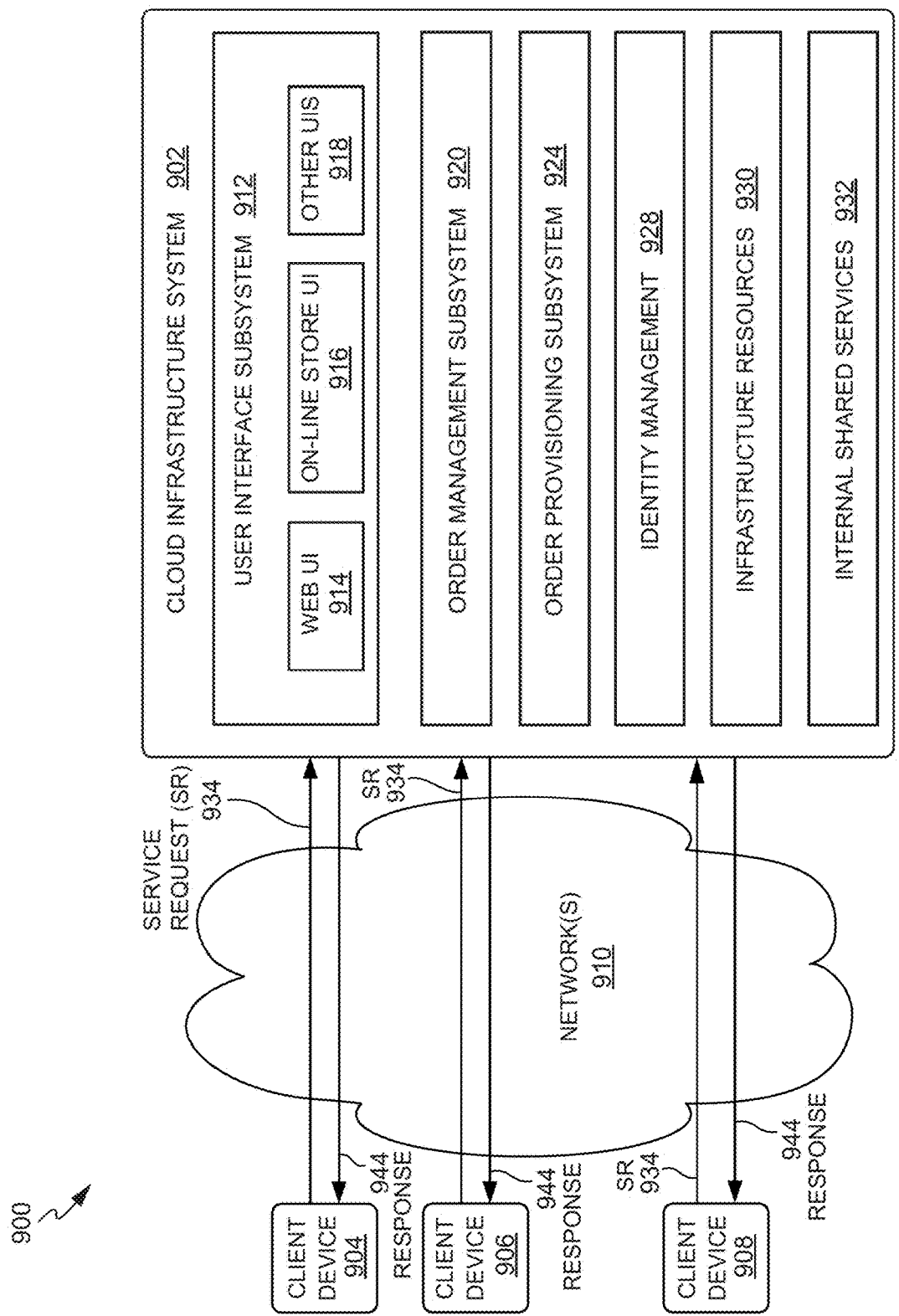
FIG. 9 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 9 is a simplified block diagram of a cloud-based system environment in which various services may be offered as cloud services in accordance with certain examples. In the example depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 812. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The example depicted in FIG. 9 is only one example of a cloud infrastructure system and is not intended to be limiting. It should be appreciated that, in some other examples, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative examples.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. For example, a user may use utterances to request the cloud infrastructure system to take a certain action (e.g., an intent), as described above, and/or provide services for a chat bot system as described herein. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer may be an individual or an enterprise. In certain other examples, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 902 and the services provided may be shared by several organizations in a related community. Various other models such as hybrids of the above mentioned models may also be used.

Client computing devices 904, 906, and 908 may be of different types (such as client computing devices 802, 804, 806, and 808 depicted in FIG. 8) and may be capable of operating one or more client applications. A user may use a client device to interact with cloud infrastructure system 902, such as to request a service provided by cloud infrastructure system 902. For example, a user may use a client device to request information or action from a chatbot as described in this disclosure.

In some examples, the processing performed by cloud infrastructure system 902 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 902 for generating and training one or more models for a chat bot system. The data used for this analysis may include structured data (e.g., data stored in a database or structured according to a structured model) and/or unstructured data (e.g., data blobs (binary large objects)).

As depicted in the example in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like. In certain examples, the storage virtual machines that are available for servicing storage requested from applications may be part of cloud infrastructure system 902. In other examples, the storage virtual machines may be part of different systems.

In certain examples, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to. For example, a customer may place a subscription order for a service offered by cloud infrastructure system 902. As part of the order, the customer may provide information identifying a chat bot system for which the service is to be provided and optionally one or more credentials for the chat bot system.

In certain examples, such as the example depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 902 as part of the provisioning process. Cloud infrastructure system 902 may generate an application ID and select a storage virtual machine for an application from among storage virtual machines provided by cloud infrastructure system 902 itself or from storage virtual machines provided by other systems other than cloud infrastructure system 902.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chat bot system ID generated by cloud infrastructure system 902 and information identifying a chat bot system selected by cloud infrastructure system 902 for the chat bot system corresponding to the chat bot system ID.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain examples, cloud infrastructure system 902 comprises an identity management subsystem (IMS) 928 that is configured to manage customer information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
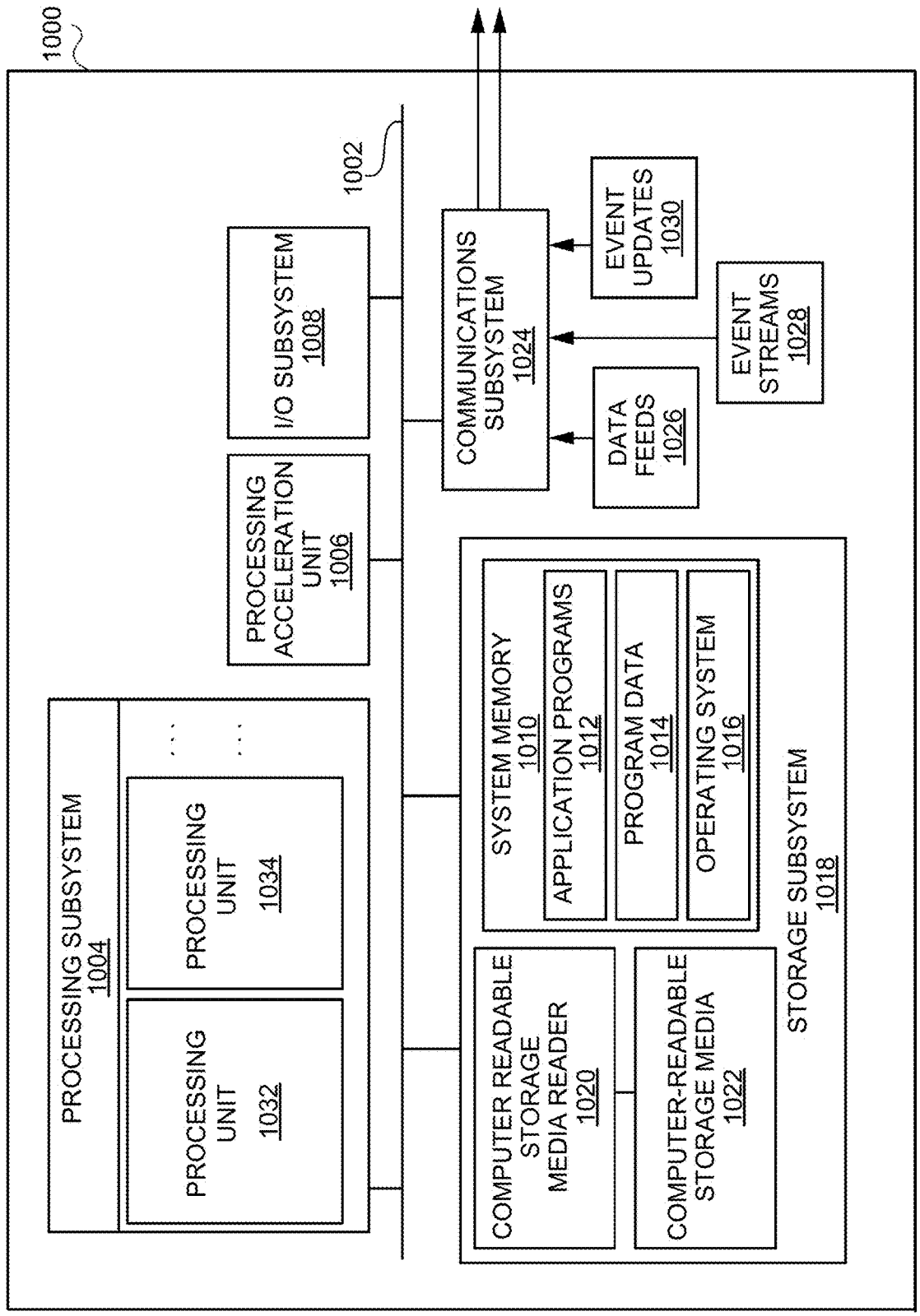
FIG. 10 illustrates an example computer system that may be used to implement various embodiments.

FIG. 10 illustrates an example of computer system 1000. In some examples, computer system 1000 may be used to implement any of the digital assistant or chat bot systems within a distributed environment, and various servers and computer systems described above. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative examples of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 may be organized into one or more processing units 1032, 1034, etc. A processing unit may include one or more processors, one or more cores from the same or different processors, a combination of cores and processors, or other combinations of cores and processors. In some examples, processing subsystem 1004 may include one or more special purpose co-processors such as graphics processors, digital signal processors (DSPs), or the like. In some examples, some or all of the processing units of processing subsystem 1004 may be implemented using customized circuits, such as application specific integrated circuits (ASICs), or field programmable gate arrays (FPGAs).

In some examples, the processing units in processing subsystem 1004 may execute instructions stored in system memory 1010 or on computer readable storage media 1022. In various examples, the processing units may execute a variety of programs or code instructions and may maintain multiple concurrently executing programs or processes. At any given time, some or all of the program code to be executed may be resident in system memory 1010 and/or on computer-readable storage media 1022 including potentially on one or more storage devices. Through suitable programming, processing subsystem 1004 may provide various functionalities described above. In instances where computer system 1000 is executing one or more virtual machines, one or more processing units may be allocated to each virtual machine.

In certain examples, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some examples. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide authentication in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some examples. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1018 may also include a computer-readable storage media reader 1020 that may further be connected to computer-readable storage media 1022. Reader 1020 may receive and be configured to read data from a memory device such as a disk, a flash drive, etc.

In certain examples, computer system 1000 may support virtualization technologies, including but not limited to virtualization of processing and memory resources. For example, computer system 1000 may provide support for executing one or more virtual machines. In certain examples, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, when computer system 1000 is used to implement bot system 120 depicted in FIG. 1, the communication subsystem may be used to communicate with a chatbot system selected for an application.

Communication subsystem 1024 may support both wired and/or wireless communication protocols. In certain examples, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1024 may provide wired network connectivity (e.g., Ethernet) in addition to or instead of a wireless interface.

Communication subsystem 1024 may receive and transmit data in various forms. In some examples, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method, comprising:
generating, by a directed acyclic graph based framework of an integrated computing system, a first model and a second model, wherein the first model is a pipeline of a first set of tasks for performing one or more operations associated with a chatbot and the second model is a pipeline of a second set of tasks for performing the one or more operations associated with the chatbot;
executing, by the directed acyclic graph based framework of the integrated computing system, the first model for the chatbot in run-time and the second model for the chatbot in a background in design-time, wherein the executing the first model and the second model comprises obtaining a data set comprising an utterance from one or more channels or the data set comprising the utterance from a database, resolving an intent using the first model based on the utterance, and resolving the intent using the second model based on the utterance;
collecting, by an event collector of the integrated computing system, one or more attributes for intent classification associated with the chatbot resolving the intent using the first model and the second model;
evaluating, by an analytic engine of the integrated computing system using one or more metrics, performance of the first model and the second model based on an analysis of the one or more attributes for the intent classification;
determining, by the analytic engine, that the performance of the second model based on the evaluation is improved as compared to the performance of the first model; and
executing, by the directed acyclic graph based framework of the integrated computing system, the second model for the chatbot in run-time rather that the first model.

2. The method of claim 1, further comprising displaying, graphically on a GUI, the pipeline of the first model; and receiving, through the GUI, a user selection of one or more user-selectable tasks; and displaying, graphically on the GUI based upon the user selection, the first set of tasks with the one or more user-selectable tasks in the pipeline.

3. The method of claim 1, further comprising: displaying, graphically on a GUI, the pipeline of the second model; and receiving, through the GUI, a user selection of one or more user-selectable tasks; and displaying, graphically on the GUI based upon the user selection, the second set of tasks with the one or more user-selectable tasks in the pipeline.

4. The method of claim 1, further comprising: receiving a user input through a user-selectable item of the one or more user-selectable items; and training the first model and the second model based upon the user input, wherein the user input is a set of utterances considered by a user to trigger an intent.

5. The method of claim 1, wherein the first model running in run-time is executing on a data set to generate an output to be used in downstream processes by the chatbot, wherein the downstream processes include providing dialog or taking action based on the intent classification, and wherein the second model running in the background in design-time is executing on the same data set to generate a different output that is not used in the downstream processes by the chatbot.

6. The method of claim 1, wherein the first set of tasks is different from the second set of tasks, and the difference is addition or subtraction of at least one task, substitution of at least one task, order of processing at least one task, or a combination thereof.

7. The method of claim 1, wherein the executing the first model and the second model comprises obtaining a data set comprising the set of utterances from one or more channels or the data set comprising the set of utterances from a database, and resolving an intent using the first model and the second model based on the set of utterances.

8. A non-transitory computer-readable memory storing a plurality of instructions executable by one or more processors, the plurality of instructions comprising instructions that when executed by the one or more processors cause the one or more processors to perform processing comprising:
generating, by a directed acyclic graph based framework of an integrated computing system, a first model and a second model, wherein the first model is a pipeline of a first set of tasks for performing one or more operations associated with a chatbot and the second model is a pipeline of a second set of tasks for performing the one or more operations associated with the chatbot;
executing, by the directed acyclic graph based framework of the integrated computing system, the first model for the chatbot in run-time and the second model for the chatbot in a background in design-time, wherein the executing the first model and the second model comprises obtaining a data set comprising an utterance from one or more channels or the data set comprising the utterance from a database, resolving an intent using the first model based on the utterance and resolving the intent using the second model based on the utterance;
collecting, by an event collector of the integrated computing system, one or more attributes for intent classification associated with the chatbot resolving the intent using the first model and the second model;

evaluating, by an analytic engine of the integrated computing system using one or more metrics, performance of the first model and the second model based on an analysis of the one or more attributes for the intent classification;

determining, by the analytic engine, that the performance of the second model based on the evaluation is improved as compared to the performance of the first model; and executing, by the directed acyclic graph based framework of the integrated computing system, the second model for the chatbot in run-time rather that the first model.

9. The non-transitory computer-readable memory of claim 8, wherein the processing further comprises: displaying, graphically on a GUI, the pipeline of the first model; and receiving, through the GUI, a user selection of one or more user-selectable tasks; and displaying, graphically on the GUI based upon the user selection, the first set of tasks with the one or more user-selectable tasks in the pipeline.

10. The non-transitory computer-readable memory of claim 8, wherein the processing further comprises: displaying, graphically on a GUI, the pipeline of the second model; and receiving, through the GUI, a user selection of one or more user-selectable tasks; and displaying, graphically on the GUI based upon the user selection, the second set of tasks with the one or more user-selectable tasks in the pipeline.

11. The non-transitory computer-readable memory of claim 8, wherein the processing further comprises: receiving a user input through a user-selectable item of the one or more user-selectable items; and training the first model and the second model based upon the user input, wherein the user input is a set of utterances considered by a user to trigger an intent.

12. The non-transitory computer-readable memory of claim 8, wherein the first model running in run-time is executing on a data set to generate an output to be used in downstream processes by the chatbot, wherein the downstream processes include providing dialog or taking action based on the intent classification, and wherein the second model running in the background in design-time is executing on the same data set to generate a different output that is not used in the downstream processes by the chatbot.

13. The non-transitory computer-readable memory of claim 8, wherein the first set of tasks is different from the second set of tasks, and the difference is addition or subtraction of at least one task, substitution of at least one task, order of processing at least one task, or a combination thereof.

14. The non-transitory computer-readable memory of claim 8, wherein the executing the first model and the second model comprises obtaining a data set comprising the set of utterances from one or more channels or the data set comprising the set of utterances from a database, and resolving an intent using the first model and the second model based on the set of utterances.

15. A system comprising:
one or more processors; and
a memory coupled to the one or more processors, the memory storing a plurality of instructions executable by the one or more processors, the plurality of instructions comprising instructions that when executed by the one or more processors cause the one or more processors to perform processing comprising:
generating, by a directed acyclic; graph based framework of an integrated computing system, a first model and a second model, wherein the first model is a pipeline of a first set of tasks for performing one or more operations associated with a chatbot and the second model is a pipeline of a second set of tasks for performing the one or more operations associated with the chatbot;

executing, by the directed acyclic graph based framework of the integrated computing system, the first model for the chatbot in run-time and the second model for the chatbot in a background in design-time, wherein the executing the first model and the second model comprises obtaining a data set comprising an utterance from one or more channels or the data set comprising the utterance from a database, resolving an intent using the first model based on the utterance, and resolving the intent using the second model based on the utterance;

collecting, by an event collector of the integrated computing system, one or more attributes for intent classification associated with the chatbot resolving the intent using the first model and the second model;

evaluating, by an analytic engine of the integrated computing system using one or more metrics, performance of the first model and the second model based on an analysis of the one or more attributes for the intent classification;

determining, by the analytic engine, that the performance of the second model based on the evaluation is improved as compared to the performance of the first model; and executing, by the directed acyclic graph based framework of the integrated computing system, the second model for the chatbot in run-time rather that the first model.

16. The system of claim 15, wherein the processing further comprises: displaying, graphically on a GUI, the pipeline of the first model; and receiving, through the GUI, a user selection of one or more user-selectable tasks; and displaying, graphically on the GUI based upon the user selection, the first set of tasks with the one or more user-selectable tasks in the pipeline.

17. The system of claim 15, wherein the processing further comprises: displaying, graphically on a GUI, the pipeline of the second model; and receiving, through the GUI, a user selection of one or more user-selectable tasks; and displaying, graphically on the GUI based upon the user selection, the second set of tasks with the one or more user-selectable tasks in the pipeline.

18. The system of claim 15, wherein the processing further comprises: receiving a user input through a user-selectable item of the one or more user-selectable items; and training the first model and the second model based upon the user input, wherein the user input is a set of utterances considered by a user to trigger an intent.

19. The system of claim 15, wherein the first model running in run-time is executing on a data set to generate an output to be used in downstream processes by the chatbot, wherein the downstream processes include providing dialog or taking action based on the intent classification, and wherein the second model running in the background in design-time is executing on the same data set to generate a different output that is not used in the downstream processes by the chatbot.

20. The system of claim 15, wherein the first set of tasks is different from the second set of tasks, and the difference is addition or subtraction of at least one task, substitution of at least one task, order of processing at least one task, or a combination thereof, and wherein the executing the first model and the second model comprises obtaining a data set comprising the set of utterances from one or more channels or the data set comprising the set of utterances from a database, and resolving an intent using the first model and the second model based on the set of utterances.

\* \* \* \* \*

UNITED STATES PATENT AND TRADEMARK OFFICE
CERTIFICATE OF CORRECTION

| | | |
|---|---|---|
| PATENT NO. | : 11,206,229 B2 | Page 1 of 1 |
| APPLICATION NO. | : 16/823611 | |
| DATED | : December 21, 2021 | |
| INVENTOR(S) | : Singaraju et al. | |

It is certified that error appears in the above-identified patent and that said Letters Patent is hereby corrected as shown below:

In the Drawings

On sheet 3 of 10, in FIG. 3, under Reference Numeral 310, Line 2, delete "Logisitic" and insert -- Logistic --, therefor.

In the Specification

In Column 18, Line 60, delete "the a" and insert -- the --, therefor.

In Columns 23-24, Line 20, delete ""oracle. cloud" and insert -- "oracle.cloud --, therefor.

In Column 27, Line 14, delete "The" and insert -- the --, therefor.

In Column 36, Line 16, delete "infra-red" and insert -- infrared --, therefor.

In the Claims

In Column 48, Line 3, in Claim 1, delete "rather that" and insert -- rather than --, therefor.

In Column 48, Line 62, in Claim 8, delete "utterance" and insert -- utterance, --, therefor.

In Column 49, Line 12, in Claim 8, delete "rather that" and insert -- rather than --, therefor.

In Column 49, Line 65, in Claim 15, delete "acyclic;" and insert -- acyclic --, therefor.

In Column 50, Line 30, in Claim 15, delete "rather that" and insert -- rather than --, therefor.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*